(12) United States Patent
Ejima et al.

(10) Patent No.: US 8,248,489 B2
(45) Date of Patent: Aug. 21, 2012

(54) IMAGE PLAYBACK DEVICE, CAMERA AND IMAGE PLAYBACK SYSTEM

(75) Inventors: Satoshi Ejima, Tokyo (JP); Takuya Shirahata, Yokohama (JP); Hiroshi Taoka, Kawasaki (JP)

(73) Assignee: Nikon Corporation, Tokyo (JP)

( * ) Notice: Subject to any disclaimer, the term of this patent is extended or adjusted under 35 U.S.C. 154(b) by 480 days.

(21) Appl. No.: 12/226,415

(22) PCT Filed: Apr. 12, 2007

(86) PCT No.: PCT/JP2007/000402
§ 371 (c)(1),
(2), (4) Date: Nov. 17, 2008

(87) PCT Pub. No.: WO2007/122811
PCT Pub. Date: Nov. 1, 2007

(65) Prior Publication Data
US 2009/0185053 A1 Jul. 23, 2009

(30) Foreign Application Priority Data
Apr. 19, 2006 (JP) .................................. 2006-115512
May 30, 2006 (JP) .................................. 2006-150116

(51) Int. Cl.
*H04N 5/262* (2006.01)
(52) U.S. Cl. .............. 348/239; 348/333.01; 348/333.11; 348/333.12; 348/231.4; 386/219; 715/723
(58) Field of Classification Search .............. 348/231.4, 348/231.99, 333.01, 331.12; 386/216, 218, 386/219; 715/723
See application file for complete search history.

(56) References Cited

U.S. PATENT DOCUMENTS

| 5,534,921 A * | 7/1996 | Sawanobori ............ 348/333.01 |
| 5,598,214 A | 1/1997 | Kondo et al. |
| 5,663,764 A | 9/1997 | Kondo et al. |
| 5,859,667 A | 1/1999 | Kondo et al. |

(Continued)

FOREIGN PATENT DOCUMENTS

EP 1 431 887 A2 6/2004

(Continued)

OTHER PUBLICATIONS

Office Action issued in Japanese Patent Application No. 2006-115512, mailed Oct. 11, 2011, with English-language translation.

(Continued)

*Primary Examiner* — Tuan Ho
*Assistant Examiner* — Kent Wang
(74) *Attorney, Agent, or Firm* — Oliff & Berridge, PLC

(57) ABSTRACT

The image playback device includes an input part that inputs images, an image output part that selects a plurality of images from the input images and sequentially outputs the plurality of images, and an output controlling part that, when an image is additionally input to the input part during output of the images by the image output part. Alternatively, the image playback device includes an image output part, an audio playback part a playback time calculation part, and an output controlling part that plays back the audio by the audio playback part while outputting the images from the image output part in accordance with the time calculated by the playback time calculation part, and when an image is added to the images, the playback time calculation part calculates time for outputting the images and the additional image in accordance with remaining playback time of the audio.

27 Claims, 25 Drawing Sheets

U.S. PATENT DOCUMENTS

| | | | |
|---|---|---|---|
| 7,154,543 B1 * | 12/2006 | Shiohara | 348/231.2 |
| 7,236,348 B2 | 7/2007 | Miyazaki | |
| 7,239,348 B2 | 7/2007 | Miyazaki | |
| 7,366,468 B2 | 4/2008 | Yoshida | |
| 7,466,349 B2 * | 12/2008 | Iijima | 348/231.99 |
| 7,617,107 B2 * | 11/2009 | Nagai | 704/270 |
| 2004/0022522 A1 | 2/2004 | Terada | |
| 2004/0130635 A1 | 7/2004 | Kasai | |
| 2005/0117030 A1 * | 6/2005 | Kim | 348/231.1 |
| 2005/0134939 A1 | 6/2005 | Ikeda et al. | |
| 2005/0265692 A1 | 12/2005 | Kaku et al. | |
| 2006/0098105 A1 * | 5/2006 | Okisu et al. | 348/231.99 |
| 2006/0116965 A1 | 6/2006 | Kudo et al. | |
| 2007/0013721 A1 * | 1/2007 | Vau et al. | 345/660 |
| 2007/0126860 A1 | 6/2007 | Yoshida | |
| 2007/0195098 A1 | 8/2007 | Hirose et al. | |

FOREIGN PATENT DOCUMENTS

| | | |
|---|---|---|
| EP | 1 498 899 A1 | 1/2005 |
| JP | A-2001-022674 | 1/2001 |
| JP | A-2002-094848 | 3/2002 |
| JP | A-2002-123273 | 4/2002 |
| JP | A-2003-116094 | 4/2003 |
| JP | A-2004-112460 | 4/2004 |
| JP | A 2004-193784 | 7/2004 |
| JP | A-2004-222175 | 8/2004 |
| JP | A-2004-328185 | 11/2004 |
| JP | A-2004-343472 | 12/2004 |
| JP | A-2005-318057 | 11/2005 |
| JP | A-2005-341391 | 12/2005 |
| JP | A-2006-074476 | 3/2006 |
| JP | A-2006-080959 | 3/2006 |
| WO | WO 2005/006199 | 1/2005 |

OTHER PUBLICATIONS

Office Action in Japanese Patent Application No. 2006-15512, mailed Mar. 21, 2012.

* cited by examiner

IMAGE PLAYBACK DEVICE, CAMERA AND IMAGE PLAYBACK SYSTEM

CROSS-REFERENCE TO RELATED APPLICATION

This application is a U.S. National Stage application claiming benefit of prior filed International Application Number PCT/JP2007/000402, filed Apr. 12, 2007, in which the International Application claims priorities from Japanese Application Numbers 2006-115512 (filed on Apr. 19, 2006) and 2006-150116 (filed on May 30, 2006), the entire contents of which are incorporated herein by reference.

TECHNICAL FIELD

The present invention relates to an image playback device, a camera and an image playback system.

BACKGROUND ART

A slide show for successively displaying a plurality of images is conventionally known, in which images shot with a camera can be successively displayed for appreciation while panned or zoomed. Furthermore, an image playback device for playing back music accompanied with display of images and an image playback system in combination with a camera are also known. On the other hand, cellular phones with cameras have widely spread, and hence images shot with such equipment can be transmitted. For example, Patent Document 2 describes an image communication device that includes an image input device with a wireless communication function and an image display device for transmitting an image from the image input device to the image display device to be displayed.

Patent Document 1: Japanese Unexamined Patent Application Publication No. 2003-116094
Patent Document 2: Japanese Unexamined Patent Application Publication No. 2002-094848

DISCLOSURE

Problems To Be Solved

In the above-described conventional technique, however, there is a problem that an image to be displayed cannot be added in the middle of a slide show.

In consideration of the conventional problem, a proposition of the present invention is to provide an image playback device, a camera and an image playback system capable of displaying an image even when the image to be displayed is newly added in the middle of appreciation of a slide show.

Means for Solving the Problems

The image playback device of the present invention includes an input part that inputs images, an image output part that selects a plurality of images from the input images and sequentially outputs the plurality of images, and an output controlling part that allows the image output part to output the additional image when an image is additionally input to the input part during output of the images by the image output part.

In particular, the output controlling part displays the additional image next to an image output by the image output part in image addition of the additional image.

Alternatively, the output controlling part displays the additional image after outputting the plurality of images.

In another aspect, the image playback device of the present invention includes an image output part that outputs images, an audio playback part that plays back audio, a playback time calculation part that calculates time for outputting images based on the number of the images output from the image output part and time for playing back the audio by the audio playback part, and an output controlling part that plays back the audio by the audio playback part while outputting the images from the image output part in accordance with the time calculated by the playback time calculation part, and the playback time calculation part calculates time for outputting the images and the additional image in accordance with remaining playback time of the audio when an image is added to the images.

Furthermore, the playback time calculation part calculates time for outputting the images based on the number of output repetitions, the number of images output in each repetition and the time for playing back the audio by the audio playback part, and when the additional image is added, the playback time calculation part calculates the number of output repetitions of the images and the additional image in accordance with remaining playback time of the audio when the image output part outputs the images repeatedly a plurality of times.

Furthermore, the playback time calculation part reduces the number of outputs of the images in accordance with remaining playback time of the audio when the additional image is added to the images.

Alternatively, the playback time calculation part deletes images in the same number as the additional image from the images when the additional image is added to the images.

Furthermore, the playback time calculation part changes the time for playing back the audio by the audio playback part in accordance with time for outputting the additional image when the additional image is added.

Furthermore, the output controlling part adds audio to the audio output by the audio playback part when the additional image is added to the images.

In particular, the image playback device further includes an input part that inputs at least one of the additional image and the additional audio.

Alternatively, the output controlling part allows playback of the additional audio to be faded out during the playback in accordance with the time for outputting the images.

Furthermore, the image output part changes a displaying area of each of the images and the additional image.

In another aspect, the camera of the present invention includes the aforementioned image playback device, and an image shooting part, and the additional image corresponds to an image shot by the image shooting part.

In another aspect, the image playback system of the present invention includes the aforementioned image playback device, and an image shooting device that includes an image sensor shooting a subject image, an image processing part reducing an image shot by the image sensor and an output part outputting the reduced image to the image playback device, and a controlling part controlling the image processing part for reducing the image to attain a pixel number sufficient for storing a plurality of images in an image storage part of the image playback device.

In particular, the image playback device outputs a free memory size of the image storage part to the image shooting device, and the controlling part controls the image processing part in accordance with the free memory size of the image storage part.

Furthermore, the image shooting device includes a storage part storing the reduced image, and the reduced image stored in the storage part is transmitted when an image having been output is output again.

Furthermore, the image shooting device includes one of a selection part selecting a reduction rate and a pixel number of an image, and the image processing part reduces the image according to the reduction rate or the pixel number selected by the selection part.

In another aspect, the image playback system includes the aforementioned image playback device, and an image shooting device that includes an image sensor shooting a subject image, an image processing part reducing an image shot by the image sensor, a communication part transmitting the reduced image to the image playback device, and a controlling part controlling the image processing part for reducing the image to attain an image transmitting and receiving time between the communication part and the image playback device shorter than an image output interval of the image output part.

Effect

According to the present invention, even when an image is newly added to be displayed in the middle of appreciation of a slide show, the added image can be displayed.

DETAILED DESCRIPTION OF THE EMBODIMENTS

An image playback device, a camera and an image playback system according to the present invention will now be described with reference to the accompanying drawings. It is noted that an image playback system is a system that includes an image playback device and a camera or the like having a function for the image playback device and displays images accompanied with music as a slide show. In each of the preferred embodiments described below, an image playback device and a camera included in an image playback system will be described in detail.

Embodiment 1

Figure 1:
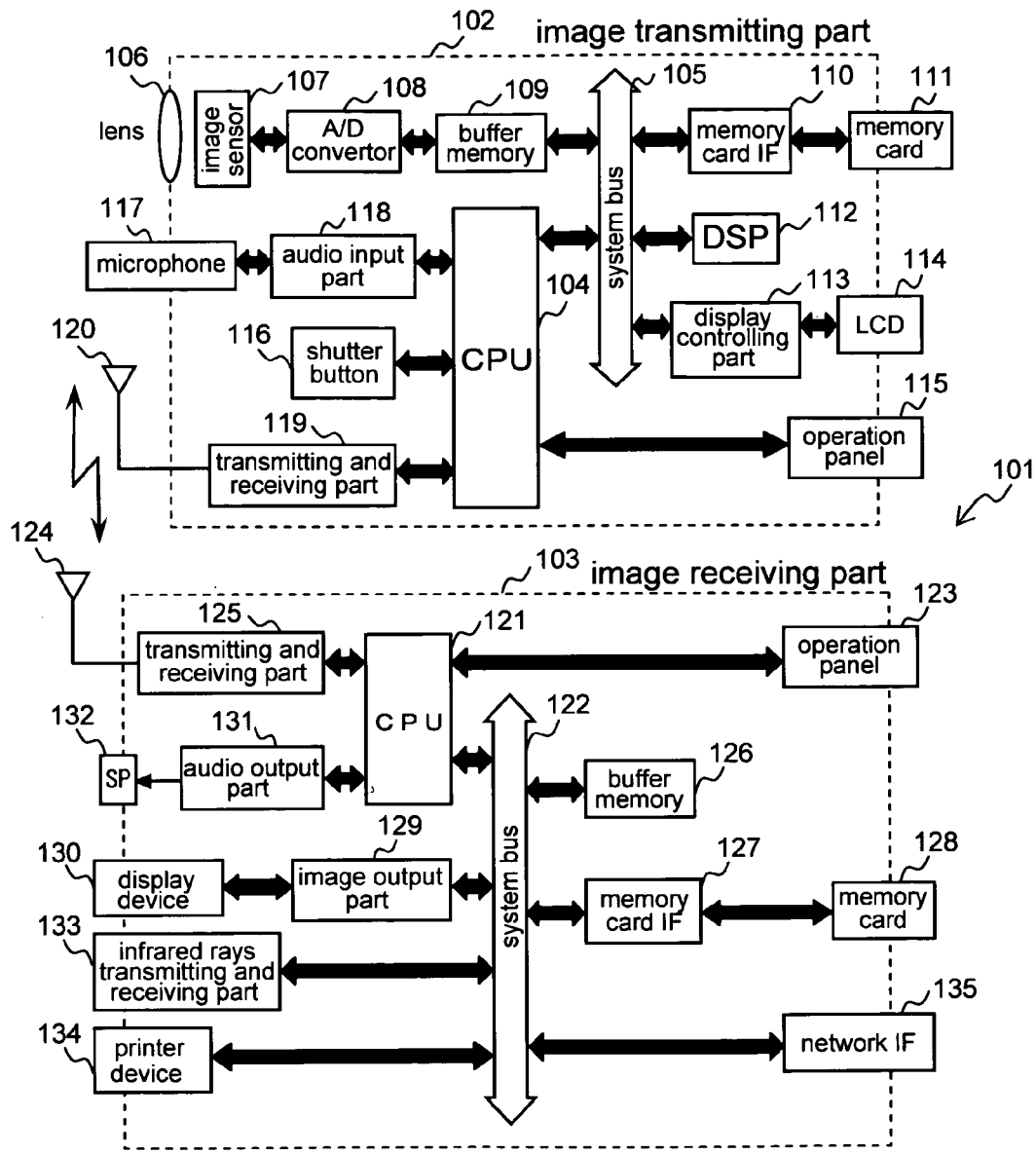
FIG. 1 is a block diagram of an image playback device according to Embodiment 1.

FIG. 1 is a block diagram of an image playback device 101 according to Embodiment 1. The image playback device 101 includes an image transmitting part 102 and an image receiving part 103. The image transmitting part 102 includes a lens 106 and an image sensor 107 and corresponds to a cellular phone, a digital camera having a wireless communication function or the like. The image transmitting part 102 reduces an image to be transmitted in accordance with device information sent from the image receiving part 103, such as resolution of an image output by the image receiving part 103 and a size of a buffer memory, and transmits the reduced image to the image receiving part 103. Furthermore, the image transmitting part 102 transmits music data in accordance with transmitted images to the image receiving part 103, and the image receiving part 103 plays back music or outputs audio data while outputting received images.

First, the architecture of the image transmitting part 102 will be described. The image transmitting part 102 is operated in accordance with a program stored in advance in a CPU (Central Processing Unit) 104. The CPU 104 controls the entire image transmitting part 102 through I/Os (input/output parts) of the CPU 104 itself and a system bus 105. The image transmitting part 102 has a camera function, and light entering through the lens 106 is imaged on the image sensor 107 and the resultant image is converted into a digital signal by an A/D converter 108 to be stored in a buffer memory 109. The buffer memory 109 temporarily stores a series of shot images.

An image stored in the buffer memory 109 can be read via the system bus 105 by the CPU 104 to be stored in a memory card 111 via a memory card IF (interface) 110. Alternatively, the image is subjected to image processing such as color correction or reduction by a DSP (digital signal processing unit) 112 before being stored in the memory card 111.

Furthermore, the CPU 104 reads an image stored in the buffer memory 109 or the memory card 111 and transmits it to a display controlling part 113 for displaying it on a liquid crystal monitor 114.

An operation panel 115 configures the image transmitting part 102 (such as setting of ON/OFF of a power supply and shooting conditions, and if necessary, setting of selection of a folder of an image to be transmitted, type selection of a display device on the side of the image receiving part 103 and a reduction rate). Furthermore, an image of a subject is shot with the image sensor 107 when a shutter button 116 is pushed down.

Audio is input through a microphone 117 and is converted into digital data by an audio input part 118 and the resultant data is stored in the buffer memory 109 or the memory card 111 by the CPU 104 together with image data. Furthermore, an audio file or an image file of already shot images can be input by using the memory card 111. Furthermore, the CPU 104 wirelessly communicates with the image receiving part 103 for transmitting image data, audio data and control data (such as a name and a size of a image file, a name and a size of a music file, a panning direction of a camera, a termination notice, etc.) by using a transmitting and receiving part 119 and an antenna 120.

Next, the architecture of the image receiving part 103 will be described. The image receiving part 103 is operated in accordance with a program stored in advance in a CPU (Central Processing Unit) 121. The CPU 121 controls the entire image receiving part 103 coupled thereto through I/Os (input/output parts) of the CPU 121 itself and a system bus 122. In the image receiving part 103, setting of ON/OFF of a power supply and setting of the image receiving part 103 are established by using an operation panel 123 or an infrared rays remote control (not shown) coupled to an infrared rays transmitting and receiving part 133. Furthermore, the CPU 121 wirelessly communicates with the image transmitting part 102 via a transmitting and receiving part 125 and an antenna 124 for receiving image data and audio data and transmitting and receiving control data (such as the type of output images, a pixel number, a size of a buffer memory 126 and a termination request). The CPU 121 stores image data and audio data transmitted from the image transmitting part 102 in the buffer memory 126 or a memory card 128 via a memory card IF 127.

Image data stored in the buffer memory 126 is converted into an image output signal in accordance with a display device 130 by an image output part 129 to be displayed by the display device 130. Although the display device 130 is included in the image receiving part 103 in this embodiment, the display device 130 may be externally provided with a terminal for outputting an image signal of the image output part 129.

On the other hand, audio data stored in the memory card 128 is read by the CPU 121 and is converted into an analog audio signal by an audio output part 131 and the audio signal is output to a speaker (SP) 132. The audio signal may be a music audio signal. Alternatively, the image output part 129 may multiply an audio signal on an image signal so as to output the multiplied signal to a television or the like externally coupled.

Furthermore, the image receiving part 103 includes a printer device 134, so that a received image can be directly printed or an image stored in the buffer memory 126 or the memory card 128 can be printed. The printer device 134 may be externally provided.

The image receiving part 103 further includes a network IF 135, and therefore, not only the wireless connection through the transmitting and receiving part 125 but also image data or audio data received via a network may be utilized. In this case, the CPU 121 utilizes image data or audio data received via the network IF 135 instead of image data or audio data received by the transmitting and receiving part 125.

Next, the operation of the image playback device 101 will be described. It is assumed that the display device 130 has an image format of SDTV (standard television) or HDTV (high definition television). The pixel number of the SDTV format is 720×480 and the pixel number of the HDTV format is 1920×1080. The pixel number of the image sensor 107 is 3840×2160.

Furthermore, the image playback device 101 is in compliance with the EXIF standard (the image file standard for a digital camera standardized by JEIDA), and a shot image held in the buffer memory 109 is stored in the memory card 111 together with an image reduced by a DSP 112 (to a pixel number of, for example, 640×480 or 160×120). Additional information such as shooting date and time is simultaneously stored.

For music data, any of various formats such as MP3, AAC or WAV is adopted, and a playback operation in accordance with the format of transmitted data is performed.

When both the image transmitting part 102 and the image receiving part 103 are turned on, the device information of the image receiving part 103 (such as an output pixel number and a buffer memory size) is automatically sent to the side of the image transmitting part 102, so that an image in accordance with the device information of the side of the image receiving part 103 can be transmitted from the side of the image transmitting part 102. In the default state, a series of images stored in the buffer memory 109 included in the main body of the image transmitting part 102 are transmitted. Not in the default state but where a folder of the memory card 111 is specified through the operation panel 115, a series of images stored in the specified folder are transmitted.

Now, program operations executed by the CPU 104 of the image transmitting part 102 and the CPU 121 of the image receiving part 103 will be described in detail with reference to a flowchart shown in FIGS. 2 and 3. According to the flowchart shown in FIGS. 2 and 3, an image is reduced in the image transmitting part 102 in accordance with the pixel number of an image output from the image receiving part 103 and the memory size and the reduced image is transmitted to the receiver side. In the image receiving part 103, an operation for performing a slide show using received images is carried out. The slide show is not always performed.

(Image transmitting; S201) The operation panel 115 is operated to turn on the image transmitting part 102.

(Image receiving part: S251) The operation panel 123 is operated to turn on the image receiving part 103.

(Image receiving part: S252) The information on the type of the display device 130 of the image receiving part 103, the pixel number (the resolution) of an image output from the image output part 129 and the size of the buffer memory 126 is sent to the image transmitting part 102. The type of the display device 130 and the pixel number of an output image are automatically recognized by the CPU 121 by reading information of the device.

(Image transmitting part: S202) The information sent in S252 is received.

(Image transmitting part: S203) The reduction rate for a shot image stored in the buffer memory 109 (or an image already shot and stored in the memory card 111) is calculated in accordance with the pixel number of an image output from the image output part 129 of the image receiving part 103.

For example, when the pixel number of the shot image is 3872×2592 and the pixel number of an output image is 720×480 of the SDTV format, the reduction rates in the length and the breadth are both approximately ⅕. Alternatively, when the pixel number of an output image is 1920×1080 of the HDTV format, the reduction rates in the length and the breadth are both approximately ½.

At this point, the reduction rates may be adjusted so that at least two images can be held in the buffer memory 126 of the image receiving part 103. For example, even when an image is transmitted after being reduced in accordance with the pixel number of an output image, if two images cannot be held by the buffer memory 126 of the image receiving part 103, the image may be further reduced in accordance with the size of the buffer memory 126 of the image receiving part 103 before being transmitted.

(Image transmitting part: S204) The image transmitting part 102 transmits an information file of a slide show with music to the image receiving part 103. The information file contains a music file name, an image file name, a panning direction for image display and the like set as a default or specified by a user.

(Image receiving part: S253) The image receiving part 103 having received the information file of the slide show with music makes preparations for receiving, in accordance with the information file, music data and image data subsequently transmitted.

(Image transmitting part: S205) Music data with the music file name transmitted beforehand is transmitted to the image receiving part 103 in a prescribed format.

(Image receiving part: S254) The image receiving part 103 having received the music data stores the music data in the buffer memory 126 or the memory card 128 via the memory card IF 127, and makes preparations for playing back music or the like through the audio output part 131 and the speaker 132 in accordance with output of images subsequently transmitted.

(Image transmitting part: S206) An image output counter M of the image transmitting part 102 is set to an initial value of 1 for making preparations for transmitting an image.

(Image receiving part: S255) An image output counter N of the image receiving part 103 is set to an initial value of 1 for making preparations for receiving an image.

(Image transmitting part: S207) The process is branched in accordance with the pixel number of an output image of the image receiving part 103 received in S202, and proceeds to S208 when the pixel number is that of the SDTV format and to S209 when the pixel number is that of the HDTV format.

(Image transmitting part: S208) (for the SDTV format) An image stored in the memory card 111 as a reduced image (thumbnail) of the EXIF in shooting is selected to be prepared as the image to be transmitted. At this point, an image reduced in the length and the breadth to ⅛ by the DSP 112 may be used instead of the reduced image (thumbnail) of the EXIF in the same manner as in S209 and S210 subsequently described.

(Image transmitting part: S209) (for the HDTV format) The shot image held in the buffer memory 109 is reduced in the length and the breadth to ½ by the DSP 112.

(Image transmitting part: S210) (for the HDTV format) The reduced image is stored in the memory card 111 and prepared as the image to be transmitted.

(Image transmitting part: S211) The image prepared to be transmitted is transmitted to the image receiving part 103.

(Image receiving part: S256) The image transmitted from the image transmitting part 102 is received. Specifically, when the pixel number of the image output part 129 of the image receiving part 103 is that of the SDTV format, the reduced image of the EXIF is received, and when the pixel number is that of the HDTV format, the image obtained by reducing the shot image in the length and the breadth to ½ is received.

(Image receiving part: S257) When the image is completed to receive, a next image request is sent to the image transmitting part 102.

Figure 2:
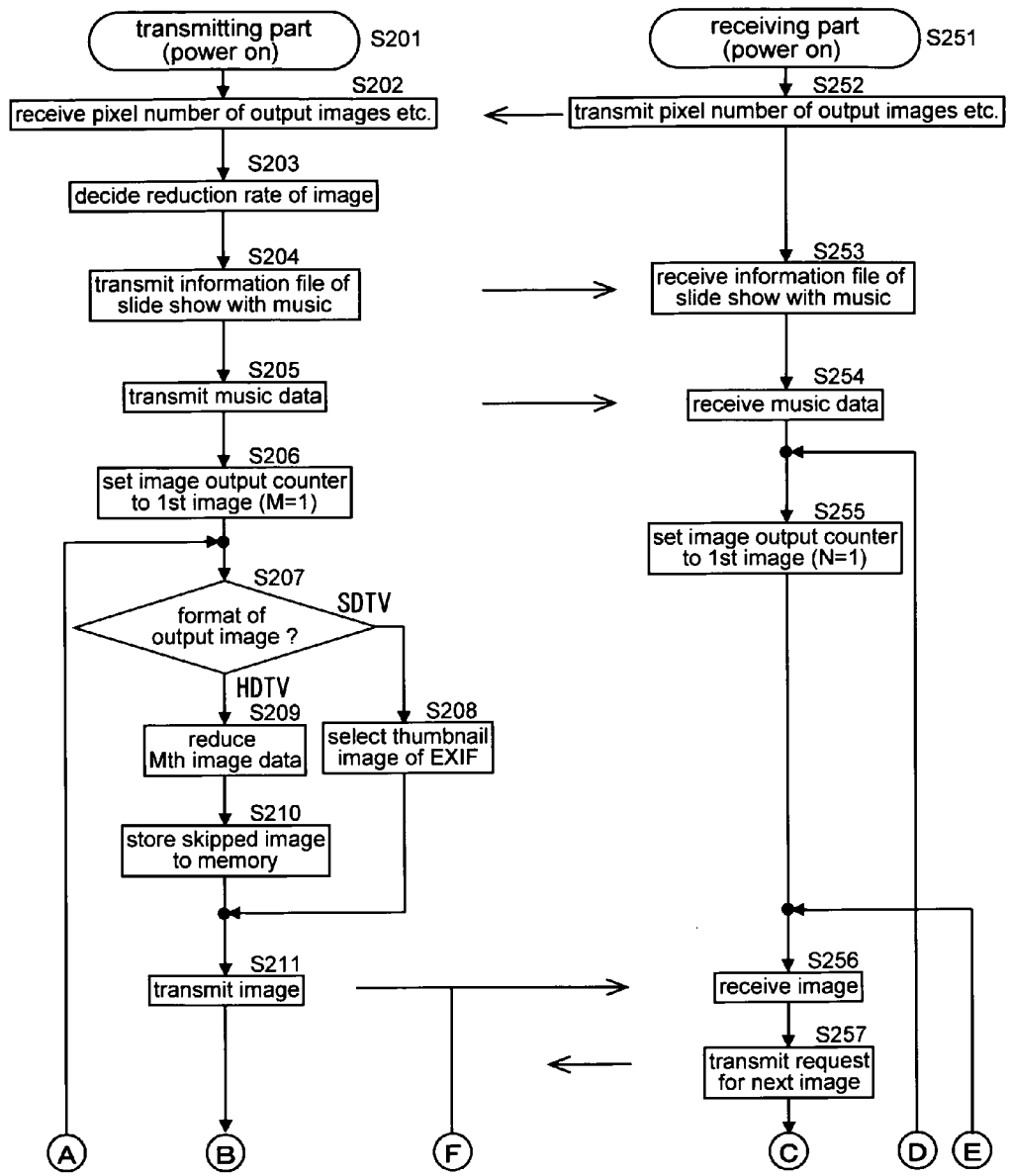
FIG. 2 is a flowchart for the image playback device according to Embodiment 1.
Figure 3:
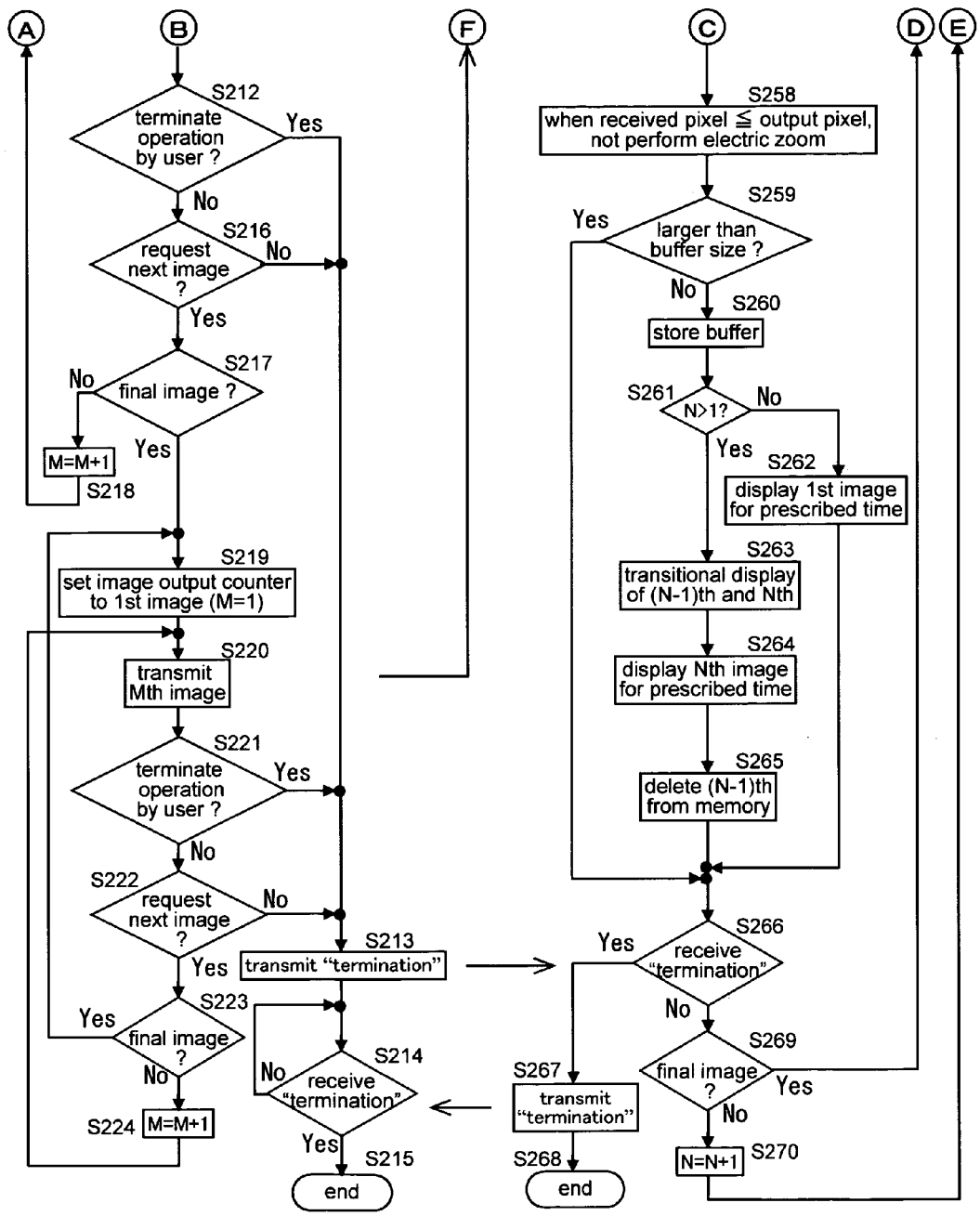
FIG. 3 is a flowchart for the image playback device according to Embodiment 1.

The flowchart of FIG. 2 is continued to FIG. 3. It is noted that points A, B, C, D and E shown in FIG. 2 are respectively continuous to points with the same references shown in FIG. 3, and the operations are proceeded in directions shown with arrows.

(Image transmitting part: S212) The image transmitting part 102 having transmitted the image in S211 judges whether or not the user has operated the operation panel 115 for a termination operation. When it is operated for the termination operation, the process proceeds to S213, and when not, the process proceeds to S216.

(Image transmitting part: S213) When the user has performed the termination operation, "termination" is transmitted, and the image receiving part 103 is informed of the termination of the series of operations, and the process proceeds to S214.

(Image transmitting part: S214) The image transmitting part 102 waits for reception of termination confirmation from the image receiving part 103, and the process proceeds to S215 where the operation of the image transmitting part 102 is all terminated.

(Image transmitting part: S216) It is judged whether or not the next image request has been issued in S257. When the next image request has been issued, the process proceeds to S217, and when not, the process proceeds to S213.

(Image transmitting part: S217) It is judged whether or not the image is a final image of images specified beforehand by the image file name. When the image transmitted in S211 is the final image, the process proceeds to S219, and when it is not the final image, the process proceeds to S218.

(Image transmitting part: S218) The image output counter M is incremented by 1, and the process returns to S207.

(Image transmitting part: S219) A second image transmitting operation is started. The image output counter is set to an initial value of 1. At this point, images transmitted through the operation flow from S207 to S217 in a first image transmitting operation are all stored in the memory card 111.

(Image transmitting part: S220) The transmitted images of the first operation stored in the memory card 111 are read and transmitted to the image receiving part 103. Specifically, when the transmitted images of the first operation have the SDTV format, the reduced images of the EXIF are transmitted, and when they have the HDTV format, the images obtained by reducing the shot images in the length and the breadth to ½ are transmitted.

(Image transmitting part: S221) It is judged whether or not the operation panel 115 has been operated by the user for a termination operation. When the termination operation has been performed, the process proceeds to S213, and when not, the process proceeds to S222.

(Image transmitting part: S222) It is judged whether or not a next image request has been issued in S257. When the next image request has been issued, the process proceeds to S223, and when not, the process proceeds to S213.

(Image transmitting part: S223) It is judged whether or not the image is a final image of images specified beforehand by the image file name. When the image transmitted in S220 is the final image, the process returns to S219, so as to repeat the transmission from a first image. When the image is not the final image, the process proceeds to S224.

(Image transmitting part: S224) The image output counter M is incremented by 1, and the process returns to S220, so as to transmit a next image.

Next, an operation performed by the image receiving part 103 after receiving a first image in S256 and issuing a request for a next image in S257 will be described.

Figure 4:
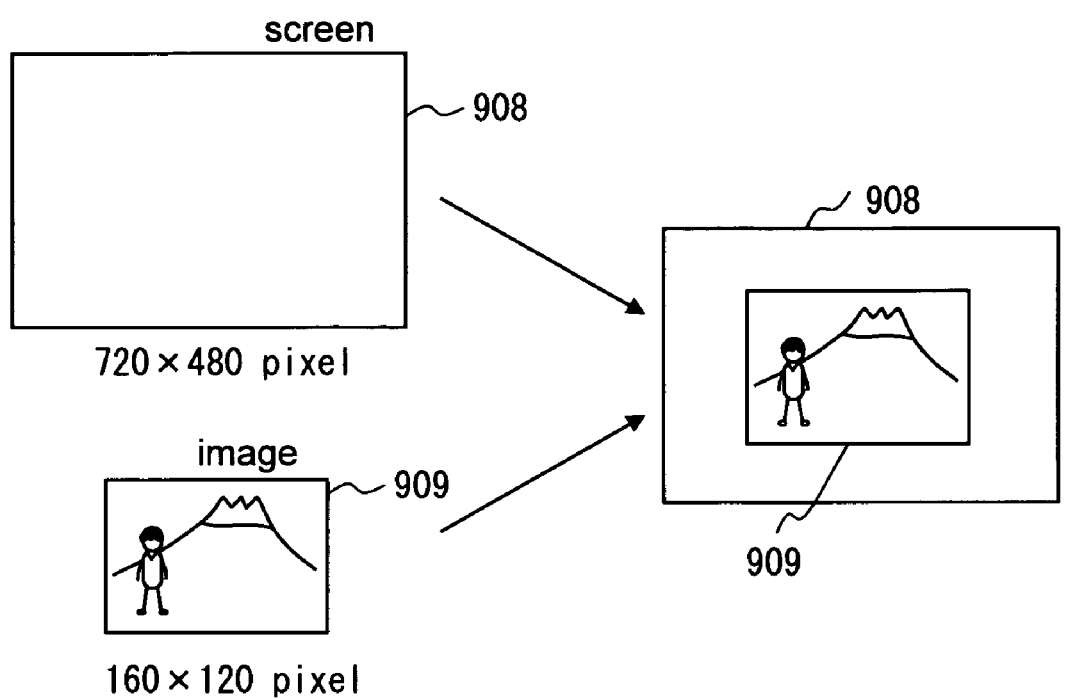
FIG. 4 is an explanatory diagram explaining an exemplified display.

(Image receiving part: S258) It is checked whether or not the output pixel number of the image output part 129 is larger than the pixel number of the received image, and when it is larger, the received image is directly stored in the buffer memory 126 without expanding the image. For example, when the SDTV format is adopted in the first image transmitting operation, the reduced image (640×480 pixels) of the EXIF is transmitted, and therefore, the image can be directly output as an SDTV image. When the pixel number of the reduced image having been received is 160×120, however, if the image is expanded in the length and the breadth by approximately 4 for displaying it on the full screen as an SDTV image, the resultant displayed image is grainy. Therefore, in such a case, a reduced image 909 is displayed on a part of a screen 908 of the display device 130 coupled to the image output part 129 as shown in FIG. 4. The display position of the reduced image 909 may be anywhere on the screen 908 of the display device 130.

Figure 5A:
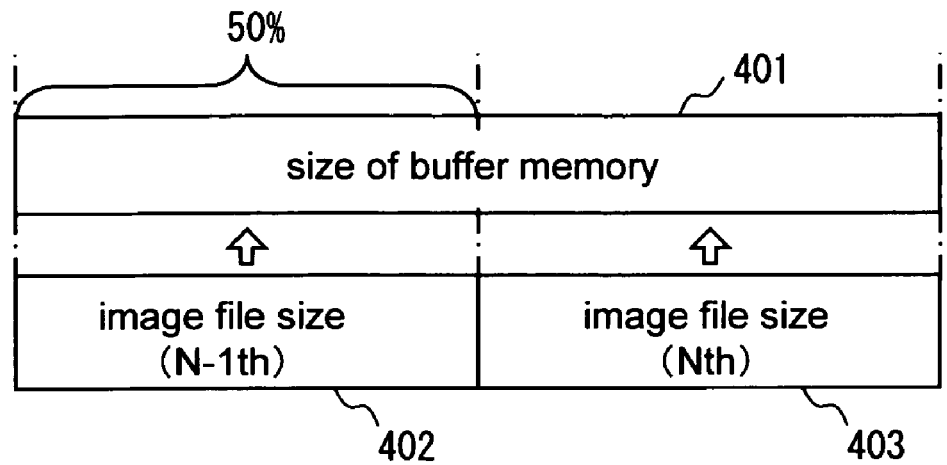
FIGS. 5(a) and 5(b) are explanatory diagrams explaining a state of a memory buffer and an aspect of image display in the image playback device according to Embodiment 1.

(Image receiving part: S259) It is judged whether or not the file size of the received image is larger than a remaining size of the memory size of the buffer memory 126, and when it is larger, the process proceeds to S266, and when smaller, the process proceeds to S260. In this manner, the buffer memory 126 can be prevented from overflowing. For example, when at least two received images can be stored in the buffer memory 126, the remaining size corresponds to 50% of the size of the buffer memory 126 if the buffer memory 126 is empty. In this case, as shown in FIG. 5(a), an image file size 402 of an (N−1)th image and an image file size 403 of an Nth image are stored in the buffer memory 126.

(Image receiving part: S260) The received image is stored in the buffer memory 126.

(Image receiving part: S261) It is judged whether or not the image output counter N is larger than 1. In other words, it is judged whether or not the image is a first image, and when N=1, that is, the image is the first image, the process proceeds to S262, and when the image is a second or subsequent image, the process proceeds to S263.

(Image receiving part: S262) The first image is output from the image output part 129 for a time set in advance, and the process proceeds to S266. The time for displaying the image may be set in advance through the operation panel 123 of the image receiving part 103 or the infrared rays remote control coupled to the infrared rays transmitting and receiving part 133, or may be set in advance through the operation panel 115 of the image transmitting part 102 and included in the information file sent in S204 to be transmitted to the image receiving part 103.

Figure 5B:
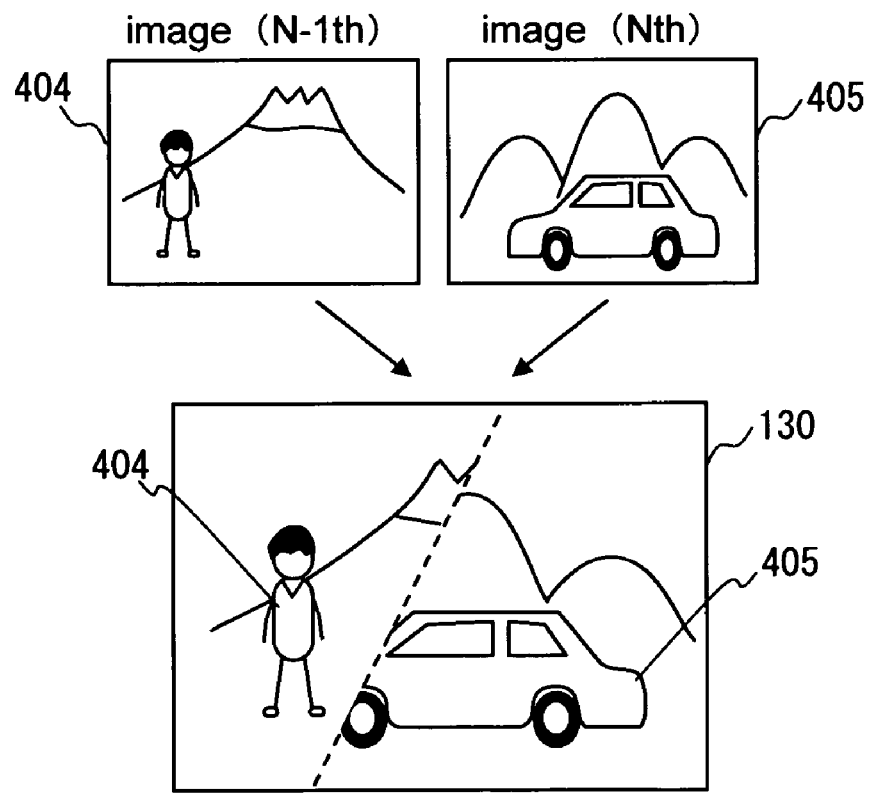

(Image receiving part: S263) With respect to second and subsequent images, the (N−1)th received image and the Nth received image are transitionally displayed. For example, FIG. 5(b) shows the transitional display of an (N−1)th received image 404 and an Nth received image 405 on the display device 130. The Nth received image 405 is gradually overwritten from the right hand side on the (N−1)th received image 404 displayed beforehand on the display device 130 by the image output part 129, so as to be ultimately substituted for the (N−1)th image 404.

(Image receiving part: S264) After the transitional display, the Nth image is output from the image output part 129 for the time set in advance in the same manner as in S262.

(Image receiving part: S265) The (N−1)th image is deleted from the buffer memory 126. In a portion where it has been deleted, a next (N+1)th image is stored. In this manner, the buffer memory 126 always holds at least two images, and hence, the transitional display as shown in FIG. 5(b) can be performed.

(Image receiving part: S266) It is checked whether or not a notice of "termination" transmitted in S213 of the image transmitting part 102 has been received. When it has been received, the process proceeds to S267, and when not, the process proceeds to S269.

(Image receiving part: S267) In response to the notice of "termination" received from the image transmitting part 102, a notice of "termination" is issued for termination confirmation, and the operation of the image receiving part 103 is all terminated in S268.

(Image receiving part: S269) It is judged whether or not the image is a final image of images specified beforehand by the image file name. When the image received in S256 is the final image, the process returns to S255, so as to repeat the series of operations from S255 to S269. When not, the process proceeds to S270.

(Image receiving part: S270) The image output counter N is incremented by 1, and the process returns to the image receiving operation of S256, so as to receive a next image.

Although the type of the display device 130 and the pixel number of an image to be output are automatically selected by reading the information of the coupled device by the CPU 121 in this embodiment, the type of the display device 130 and the pixel number of an image to be output may be selected through the operation panel 123. Alternatively, with the processing performed in S252 and S202 omitted, the type of the display device 130 and the pixel number of an image to be output may be selected through the operation panel 115 of the image transmitting part 102. In this case, however, the selected pixel number may be larger than the pixel number of an output image of the image receiving part 103, and when the size of a received image is too large, it may be eliminated in the processing of S259.

Figure 6:
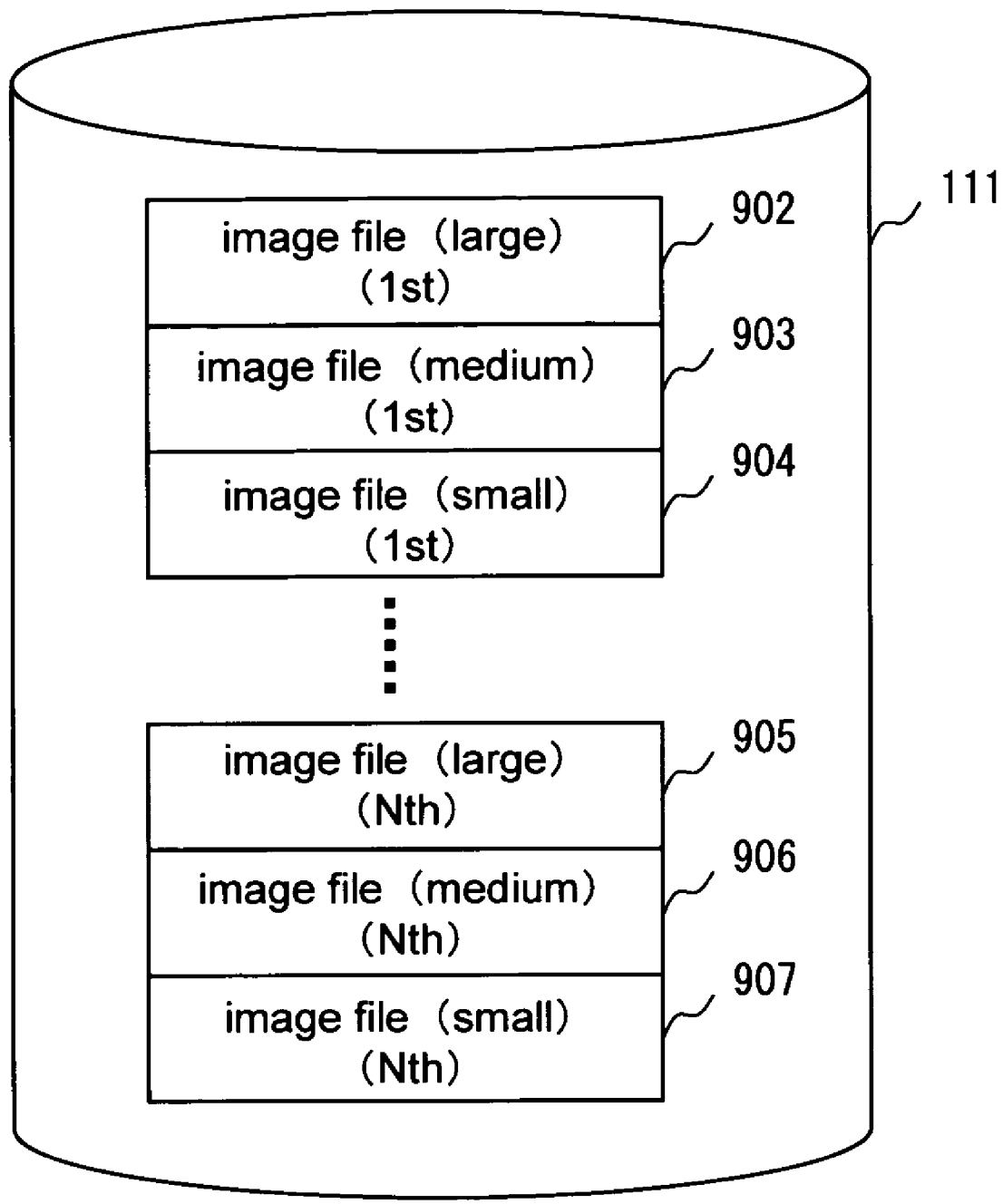
FIG. 6 is an explanatory diagram explaining an exemplified image file.

Although the reduction operation is performed for the HDTV format in the branched operation of S207, images with various resolutions may be stored in advance in the memory card 111 as in the SDTV format so as to select, from the memory card 111, an image with a close pixel number to the image to be output. For example, the same images with different resolutions are stored in advance in the memory card 111 as shown in FIG. 6. Specifically, with respect to a first image, a first image file (large) 902, a first image file (medium) 903 and a first image file (small) 904 are stored, and similarly, with respect to an Nth image, an Nth image file (large) 905, an Nth image file (medium) 906 and an Nth image file (small) 907 are stored.

It is assumed at this point that the image file (large) has a pixel number of 3840×2160, the image file (medium) has a pixel number of 1920×1080 and the image file (small) has a pixel number of 640×480. When the display device 130 of the image receiving part 103 is found to have the SDTV format in the processing of S207, the first image file (small) 904 and the Nth image file (small) 907 are read from the memory card 111. Similarly, when the display device has the HDTV format, the first image file (large) 902 and the Nth image file (large) 905 are read from the memory card 111. As a result, the reduction operation performed in the transmission can be omitted. Furthermore, although the image is output from the image output part 129 for the time set in advance in the processing of S262 and S264, since the CPU 121 can grasp the speed of the transmitting and receiving part 125 communicating with the transmitting and receiving part 119 of the image transmitting part 102, the transmitting time of an image can be calculated when the size of image data to be transmitted from the image transmitting part 102 is sent in advance. Therefore, in the processing of S262 and S264, when the CPU 121 sets the time for outputting the image from the image output part 129 to be longer than the calculated transmitting time, sequential images can be smoothly output.

On the contrary, the CPU 104 of the image transmitting part 102 may calculate the transmitting time of an image and inform the image receiving part 103 of the output time of the image in accordance with the transmitting time.

In this manner, in the image playback device 101 of this embodiment, the image transmitting part 102 is informed in advance of the pixel number of an output image of the image output part 129 to be displayed on the display device 130 of the image receiving part 103, and therefore, the image transmitting part 102 can reduce the pixel number of an image to be transmitted to a necessary and minimum number. As a result, the file size of the image to be transmitted is small, and hence, the transmitting time necessary for transmitting an image from the transmitting and receiving part 119 of the image transmitting part 102 to the transmitting and receiving part 125 of the image receiving part 103 can be shortened as compared with the case where a shot image with a large pixel number is directly transmitted.

Furthermore, since the buffer memory 126 of the image receiving part 103 stores at least two images, two images to be successively displayed can be transitionally displayed. At this point, since an image with a size larger than a remaining size of the buffer memory 126 is not stored, the buffer memory 126 can be prevented from overflowing. As a result, there is no need to use a memory with a large size as the buffer memory 126, and hence, the cost of the whole device can be reduced.

In addition, when an image with a smaller pixel number than the output pixel number of the image output part 129 is output, the image is directly output without expanding, and therefore, the displayed image can be prevented from being grainy.

Furthermore, in the operation of the image transmitting part 102, when images having been subjected to the reduction operation in the first image transmission are stored in the memory card 111, there is no need to perform the reduction operation again in the second or subsequent transmission.

Embodiment 2

Figure 7:
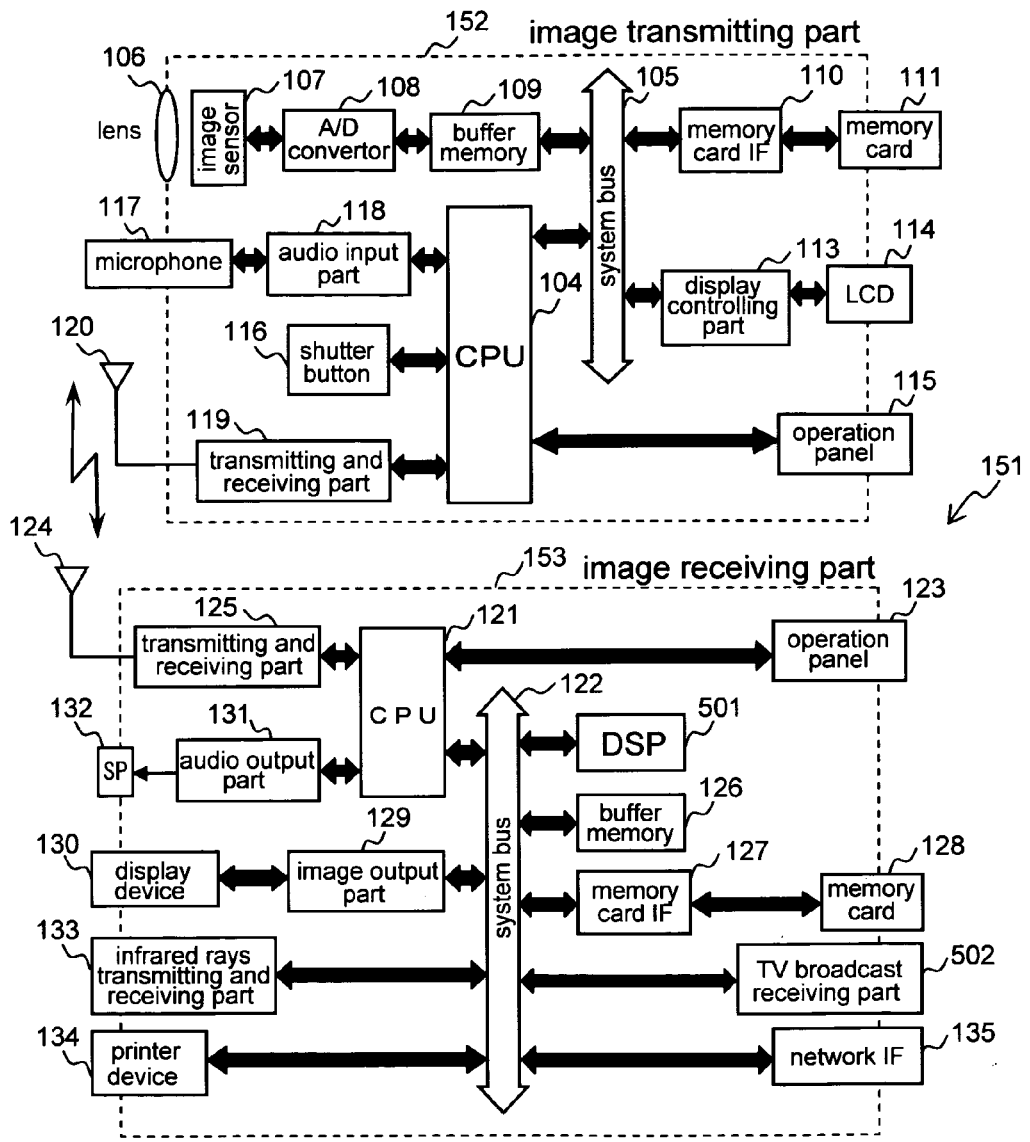
FIG. 7 is a block diagram of an image playback device according to Embodiment 2.

An image playback device 151 of Embodiment 2 shown in FIG. 7 includes an image transmitting part 152 and an image receiving part 153. In the image transmitting part 152 and the image receiving part 153, composing elements referred to with the same reference numerals are the same as those used in the image transmitting part 102 and the image receiving part 103 of Embodiment 1. Differently from Embodiment 1, the DSP 112 for performing the reduction operation for an image is not included in the image transmitting part 152 but a DSP 501 for performing the reduction operation for an image is provided in the image receiving part 153.

A TV broadcast receiving part 502 is further provided, and hence, the image receiving part 153 may be used as a television and a TV broadcast received by the TV broadcast receiving part 502 can be displayed on a display device 130. In particular, the TV broadcast receiving part 502 can utilize not only the wireless connection with a transmitting and receiving part 125 but also image data and audio data of a received TV broadcast similar to the network IF 135 described in Embodiment 1. In this case, a CPU 121 utilizes image data and audio data received from the TV broadcast instead of image data and audio data received by the transmitting and receiving part 125. Specifically, image data received by the transmitting and receiving part 125 from the image transmitting part 152 or image data and audio data of a TV broadcast is output from an image output part 129.

In the same manner as in Embodiment 1, when both the image transmitting part 152 and the image receiving part 153 are turned on, the device information of the side of the image receiving part 153 is automatically sent to the side of the image transmitting part 152, and an image in accordance with the device information of the side of the image receiving part 153 is transmitted from the side of the image transmitting part 152. In the default state, a series of images stored in a buffer memory 109 included in the main body of the image transmitting part 152 are transmitted. Not in the default state but where a folder of a memory card 111 is specified through an operation panel 115, a series of images stored in the specified folder are transmitted.

Figure 8:
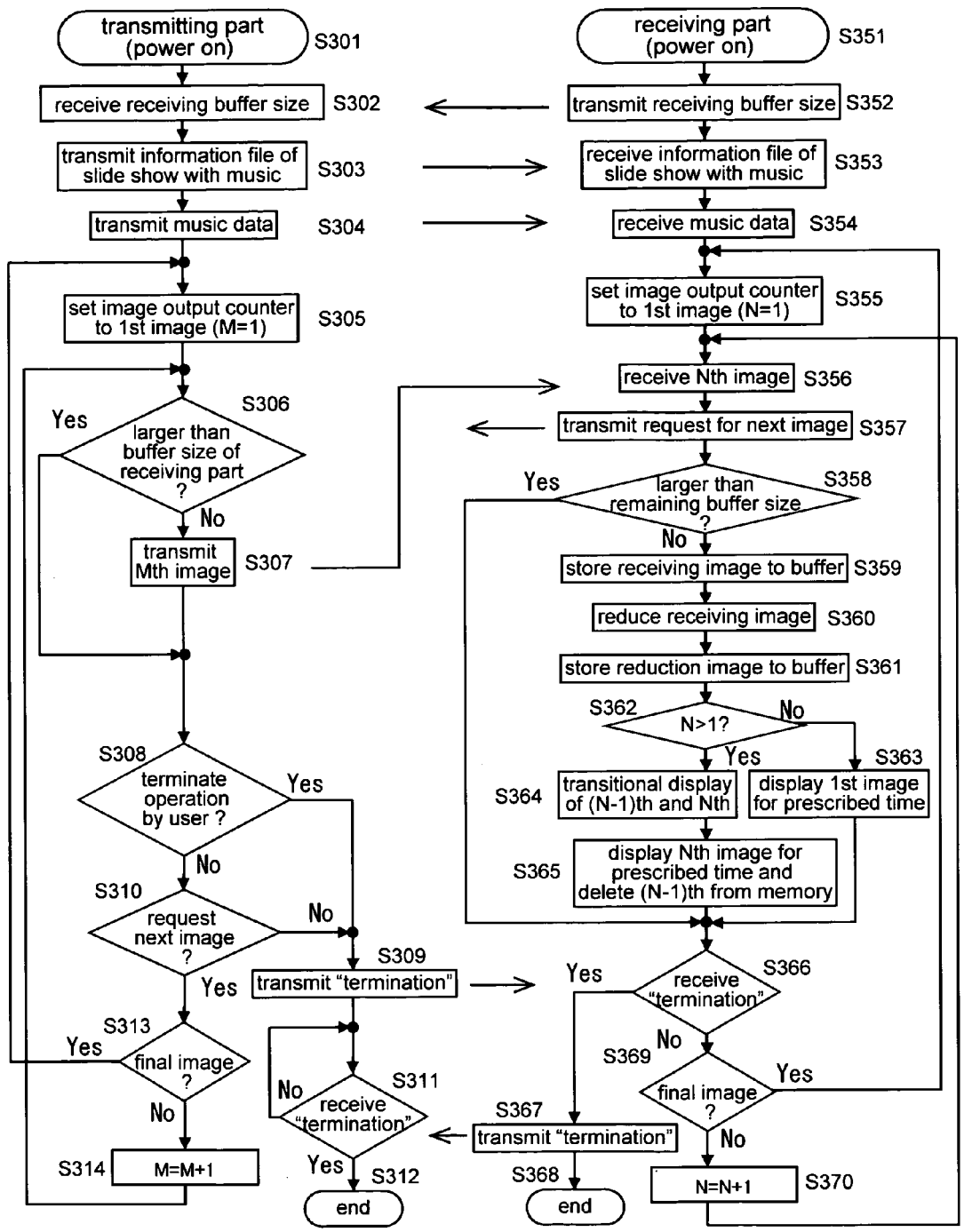
FIG. 8 is a flowchart for the image playback device according to Embodiment 2.

Now, program operations executed by a CPU 104 of the image transmitting part 152 and the CPU 121 of the image receiving part 153 will be described in detail with reference to a flowchart shown in FIG. 8. It is herein assumed that the display device 130 adopts the HDTV image format.

First, in the same manner as in S201 and S251 of Embodiment 1, the image transmitting part 152 and the image receiving part 153 are turned on in S301 and S351.

(Image receiving part: S352) Information on the size of a buffer memory 126 of the image receiving part 153 is sent to the image transmitting part 152. Differently from Embodiment 1, the pixel number of an output image need not be sent.

(Image transmitting part: S302) The information on the size of the buffer memory 126 of the image receiving part 153 is received.

Next processing of S303, S304, S353 and S354 is executed in the same manner as S204, S205, S253 and S254 of Embodiment 1, and thus, an information file and music data of a slide show with music are transmitted and received. Furthermore, in S305 and S355, an image output counter M of the image transmitting part 152 and an image output counter N of the image receiving part 153 are respectively set to an initial value of 1, so as to make preparations for transmitting and receiving an image.

(Image transmitting part: S306) It is judged whether or not the file size of an image to be transmitted is larger than the memory size of the buffer memory 126 of the image receiving part 153 having been received in S302, and when it is larger, the process proceeds to S308, and when it is smaller, the process proceeds to S307. In this manner, the buffer memory 126 can be prevented from overflowing and unnecessary transmission can be avoided.

(Image transmitting part: S307) An image held by the buffer memory 109 is transmitted to the image receiving part 153 without reducing.

(Image receiving part: S356) The image transmitted from the image transmitting part 152 is received.

(Image receiving part: S357) When the image has been received, a request for a next image is sent to the image transmitting part 152.

Processing from S308 to S314 performed by the image transmitting part 152 is the same as that performed from S221 to S224 of Embodiment 1. Specifically, when the operation panel 115 is operated by a user for a termination operation and when the request for a next image is not issued, the operation of the image transmitting part 152 is all terminated. When the transmitted image is a final image, the process returns to S305, so as to repeat the transmission from a first image. When the transmitted image is not a final image, the image output counter M is incremented by 1, and the process returns to S306 so as to transmit a next image.

On the other hand, after receiving the image, the image receiving part 153 is operated as follows:

(Image receiving part: S358) It is judged whether or not the file size of the received image is larger than a remaining size of the memory size of the buffer memory 126, and when it is larger, the process proceeds to S366, and when it is smaller, the process proceeds to S359. As a result, since an image with a larger size than the buffer memory 126 is not stored, the buffer memory 126 can be prevented from overflowing. As described with reference to FIG. 5 in Embodiment 1, it is necessary for the buffer memory 126 to hold at least two output images to be output from the image output part 129 for the transitional display. In other words, differently from Embodiment 1, the buffer memory 126 should hold, at the minimum, at least one image not reduced and transmitted from the image transmitting part 152 and at least two reduced images. Therefore, the remaining size herein corresponds to a size obtained by subtracting the sizes of at least two reduced images from the size of the buffer memory 126. In Embodiment 1, since a reduced image is transmitted, there is no need to store an image not reduced but at least two reduced images are stored.

(Image receiving part: S359) The received image is stored in the buffer memory 126.

(Image receiving part: S360) The received image is reduced by the DSP 501. Since the display device 130 of this embodiment is assumed to adopt the HDTV format, a shot image is reduced in the length and the breadth to ½ so that the 3840×2160 pixels of the shot image can be close to the 1920× 1080 pixels of an HDTV image.

(Image receiving part: S361) The reduced image is stored in the buffer memory 126.

Next processing performed from S362 to S365 is the same as that performed from S261 to S265 of Embodiment 1. Specifically, the image stored in the buffer memory 126 is displayed for a time set in advance, and with respect to second and subsequent images, an (N−1)th received image and an Nth received image are transitionally displayed, and then, the (N−1)th image is deleted from the buffer memory 126.

Next processing performed from S366 to S370 is the same as that performed from S266 to S270 of Embodiment 1. Specifically, when a notice of "termination" has been received from the image transmitting part 152, a notice of "termination" is returned to the image transmitting part 152, and the operation of the image receiving part 153 is all terminated. When the received image is a final image, the process returns to S355, so as to repeat the reception from a first image. When the received image is not a final image, the image output counter N is incremented by 1, and the process returns to S356 so as to receive a next image.

In this manner, in the image playback device 151 of this embodiment, since an image is reduced by the image receiving part 153, an image in accordance with the pixel number of an image to be output from the image output part 129 can be output. Furthermore, since the image transmitting part 152 is informed of the size of the buffer memory 126 of the image receiving part 153, the buffer memory 126 can be prevented from overflowing and unnecessary transmission can be avoided. Similarly, since a received image with a larger size than a remaining size of the buffer memory 126 is also not stored in the image receiving part 153, the buffer memory 126 can hold at least two output images so as to perform smooth transitional display.

Although the display device 130 of this embodiment is described to adopt the HDTV image format, a determination operation corresponding to the processing of S207 of Embodiment 1 may be performed between S359 and S360. When the determination operation is performed, for example, in S360, the image is reduced in the length and the breadth to ⅓ if the image has the SDTV format and is reduced in the length and the breadth to ½ if it has the HDTV format.

Furthermore, although the image is output from the image output part 129 for the time set in advance in S363 and S365, the CPU 121 can calculate in advance the transmitting time for an image as described in Embodiment 1. Therefore, in the processing of S363 and S365 where a preceding image should be output until a next image is received, the CPU 121 sets the time for outputting the image from the image output part 129 to be longer than the calculated transmitting time, and thus, sequential images can be smoothly output.

Embodiment 3

The architecture of an image playback device according to Embodiment 3 is the same as that of the image playback device 151 according to Embodiment 2 shown in FIG. 7. Differently from Embodiment 2, all images reduced by a DSP 501 of the image receiving part 153 are stored in a memory card 128 coupled via a memory card IF 127. It is assumed in this embodiment that an image sensor 107 has a pixel number of 3840×2160 and that a display device 130 adopts the SDTV image format as in Embodiment 1.

Figure 9:
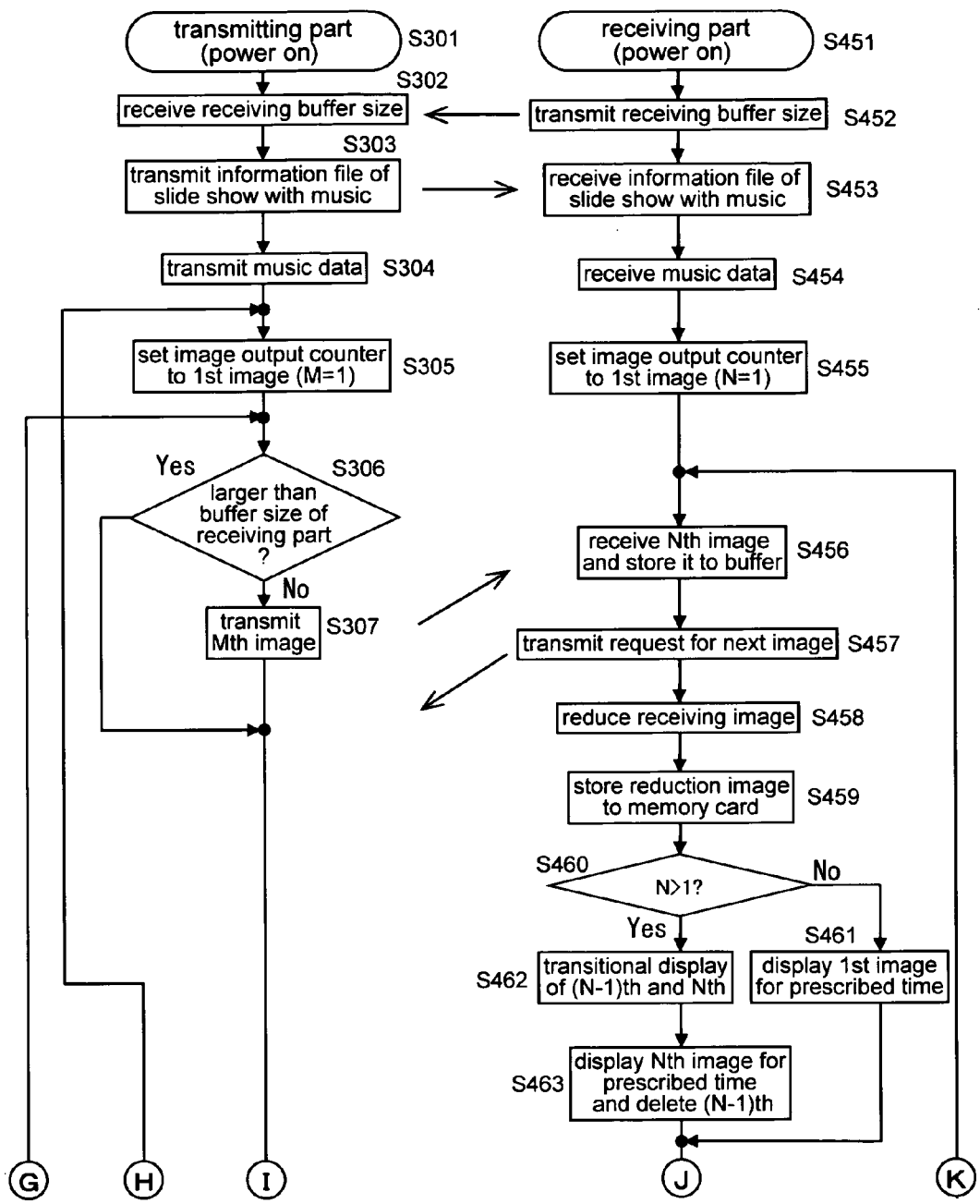
FIG. 9 is a flowchart for an image playback device according to Embodiment 3.
Figure 10:
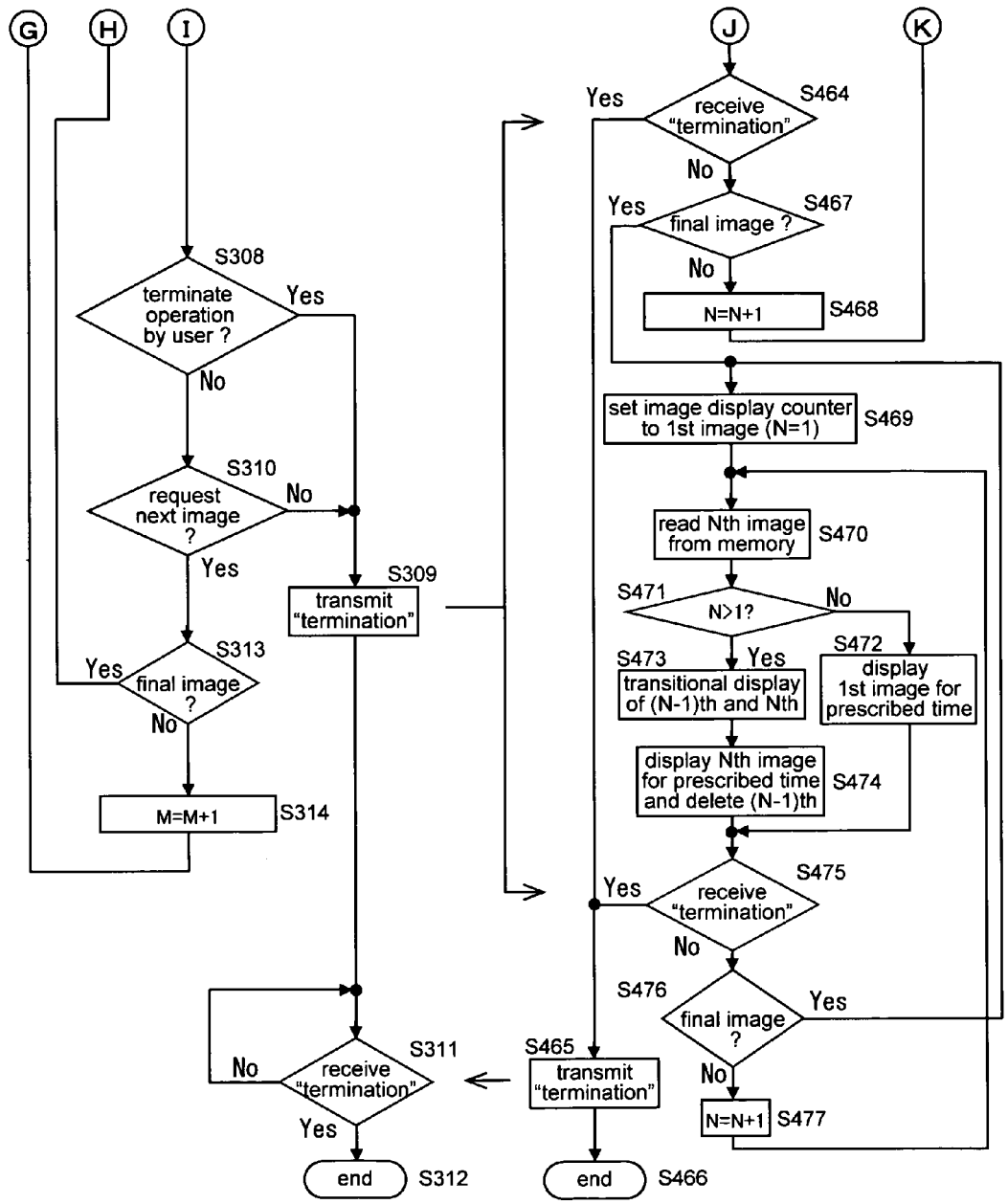
FIG. 10 is a flowchart for the image playback device according to Embodiment 3.

The operation of the image playback device 151 of Embodiment 3 is shown in a flowchart of FIGS. 9 and 10. The operation of the image transmitting part 152 is omitted from description because it is the same as that performed in processing from S301 to S314 of Embodiment 2, and the operation of the image receiving part 153 will be herein described. Furthermore, the operation of the image receiving part 153 performed from S451 to S455 is the same as that performed from S351 to S355 of Embodiment 2.

(Image receiving part: S456) An image transmitted from the image transmitting part 152 is received and stored in a buffer memory 126. At this point, a remaining size of the buffer memory 126 may be controlled as in the processing of S358 of Embodiment 2.

(Image receiving part: S457) After receiving the image, a request for a next image is sent to the image transmitting part 152.

(Image receiving part: S458) The received image is reduced by the DSP 501. Since the display device 130 adopts the SDTV format in this embodiment, a shot image is reduced in the length and the breadth to ⅓ so that the 3840×2160 pixels of the shot image can be close to the 720×480 pixels of an SDTV image.

(Image receiving part: S459) The reduced image is stored in the memory card 128.

Next processing performed from S460 to S463 is the same as that performed from S261 to S265 of Embodiment 1. Specifically, an image stored in the buffer memory 126 is displayed for a time set in advance, and with respect to second and subsequent images, an (N−1)th received image and an Nth received image are transitionally displayed, and then, the (N−1)th image is deleted from the buffer memory 126.

The flowchart of FIG. 9 is continued to FIG. 10. It is noted that points G, H, I, J and K shown in FIG. 9 are respectively continuous to points with the same references shown in FIG. 10, and the operations are proceeded in directions shown with arrows.

Next processing performed from S464 to S468 is the same as that performed from S266 to S270 of Embodiment 1 except for branching. Specifically, when a notice of "termination" has been received from the image transmitting part 152, a notice of "termination" is returned to the image transmitting part 152, and the operation of the image receiving part 153 is all terminated. When the received image is not a final image, an image output counter N is incremented by 1, and the process returns to S456 so as to receive a next image. When the received image is a final image, the process is branched differently from Embodiment 1 and proceeds to S469.

In processing performed thereafter, the image receiving part 153 receives no images but performs an operation in which an image stored in the memory card 128 having been reduced in the first transmission is read to be output from an image output part 129 to the display device 130.

(Image receiving part: S469) The image output counter N of the image receiving part 153 is set to an initial value of 1.

(Image receiving part: S470) An image stored in the memory card 128 and having been reduced in the first transmission is read.

In next processing performed from S471 to S474, an image is output and displayed in the same manner as in the processing performed from S460 to S463.

Next processing performed from S475 to S477 is the same as that performed from S464 to S468 of Embodiment 1 except for branching. Specifically, when a notice of "termination" has been received from the image transmitting part 152, the operation of the image receiving part 153 is all terminated. When the image read from the memory card 128 is not a final image, the image output counter N is incremented by 1 and the process returns to S470 so as to read a next image from the memory card 128. When the image read from the memory card 128 is a final image, the process returns to S469, so as to repeat reading from a first image from the memory card 128.

In this manner, in the image playback device 151 of this embodiment, since images are reduced in the image receiving part 153 and all the reduced images are stored in the memory card 128, there is no need to transmit the same image from the image transmitting part 152 a plurality of times as in Embodiment 2. Accordingly, since there is no need to consider the transmitting time of an image from the image transmitting part 152 to the image receiving part 153 in a second and subsequent display, even when an output interval for outputting images from the image output part 129 is shortened, the display device 130 can smoothly display the images without interruption.

Furthermore, in the same manner as in Embodiment 2, image data received from a network IF 135 or a TV broadcast receiving part 502 can be displayed on the display device 130 by the image output part 129 by subjecting such image data to the reduction operation and the like in the same manner as image data received from the image transmitting part 152.

Although the display device 130 of this embodiment is described to adopt the SDTV image format, a determination operation corresponding to the processing of S207 of Embodiment 1 may be performed between S457 and S458. When the determination operation is performed, for example, in S458, the image is reduced in the length and the breadth to ⅕ if the image has the SDTV format and is reduced in the length and the breadth to ½ if it has the HDTV format.

Furthermore, although an image is output from the image output part 129 for the time set in advance in S461 and S463, the CPU 121 can calculate transmitting time for an image as described in Embodiments 1 and 2. Therefore, when the time for outputting an image from the image output part 129 is set to be longer than the transmitting time of the image, sequential images can be smoothly output.

Embodiment 4

The architecture of an image playback device according to Embodiment 4 is the same as that of the image playback device 101 of Embodiment 1 shown in FIG. 1. In this embodiment, an image reduced in the image transmitting part 102 is printed by the printer device 134 of the image receiving part 103.

Figure 11:
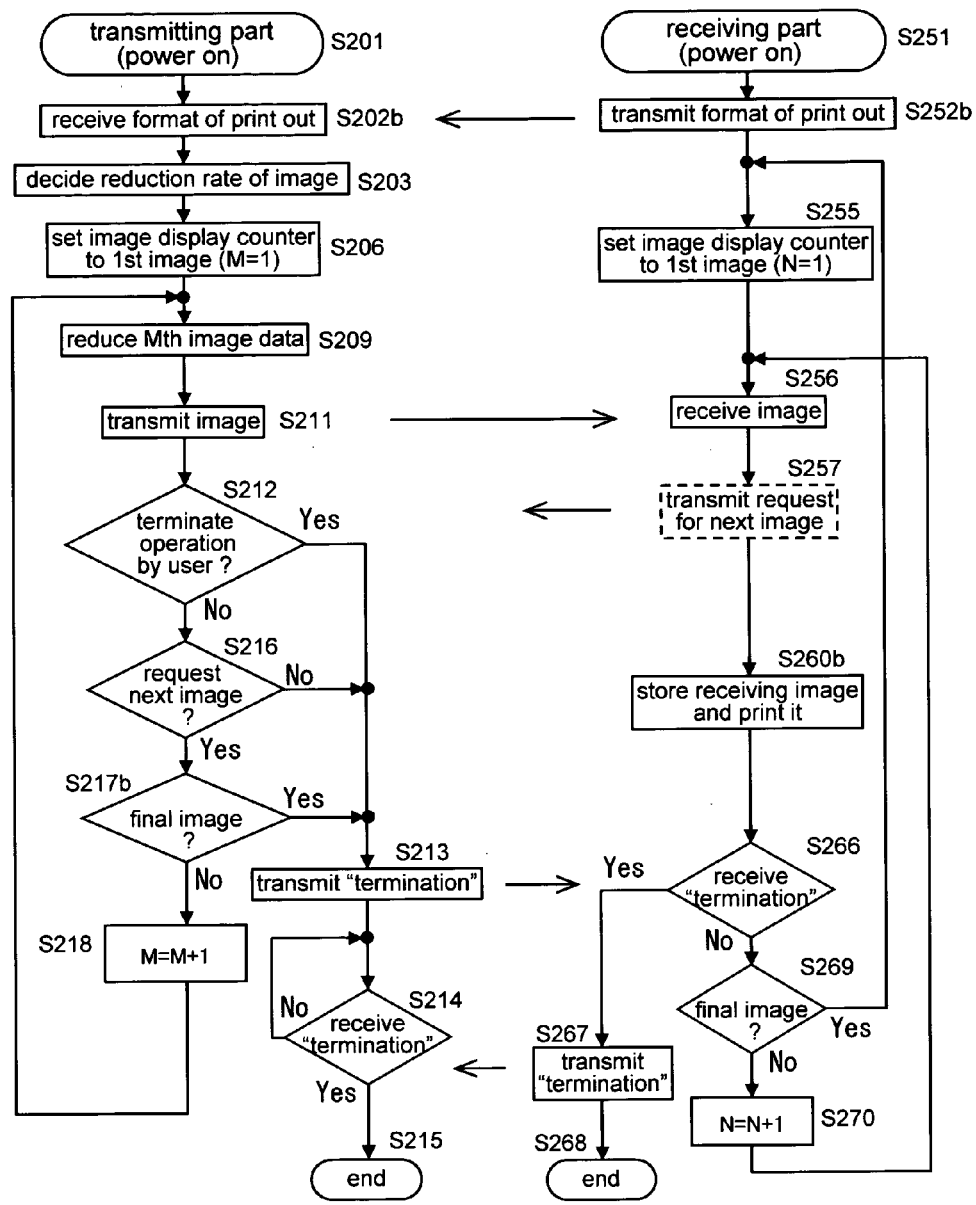
FIG. 11 is a flowchart for an image playback device according to Embodiment 4.

The operation of the image playback device 101 of this embodiment will be described with reference to a flowchart of FIG. 11. It is noted that the same reference numerals are used to refer to the same steps as those shown in the flowchart of FIGS. 2 and 3.

In S201 and S251, the image transmitting part 102 and the image receiving part 103 are turned on.

(Image receiving part: S252b) Information on the pixel number (resolution) of the printer device 134 of the image receiving part 103 is sent to the image transmitting part 102.

(Image transmitting part: S202b) The information on the pixel number of the printer device 134 of the image output part 129 of the image receiving part 103 is received.

Processing performed from S203 to S216 is the same as that of Embodiment 1, and an image is reduced to be in accordance with the pixel number of the printer device 134 of the image output part 129 of the image receiving part 103 and the reduced image is transmitted.

(Image transmitting part: S217b) It is judged whether or not the image is a final image of images specified beforehand by an image file name. When the image transmitted in S211 is not a final image, the process proceeds to S218, and when it is a final image, the process proceeds to S213 differently from Embodiment 1, and the operation of the image transmitting part 102 is all terminated.

(Image receiving part: S260b) The received image is once stored in the buffer memory 126 and then output to the printer device 134.

Processing other than that described above is the same as that of Embodiment 1 and hence the description is omitted.

In this manner, in the image playback device 101 of this embodiment, since the image transmitting part 102 is informed of the printing pixel number of the printer device 134 of the image receiving part 103, the image transmitting part 102 can reduce the pixel number of an image to be transmitted to a necessary and minimum number. As a result, the file size of an image to be transmitted is small, and hence, the transmitting time necessary for transmitting an image from the transmitting and receiving part 119 of the image transmitting part 102 to the transmitting and receiving part 125 of the image receiving part 103 can be shortened as compared with the case where a shot image with a large pixel number is directly transmitted.

Although an image is printed only once in this embodiment, when an image reduced in the first image transmission is stored in the memory card 111 in the operation of the image transmitting part 102 in the same manner as in Embodiment 1, there is no need to repeat the reduction operation in printing the image a plurality of times. Alternatively, the reduction operation may be performed in the image receiving part 103 or 153 in the same manner as in Embodiment 2 or 3, so as to output an image to the printer device 134 instead of the display device 130.

Embodiment 5

Figure 12:
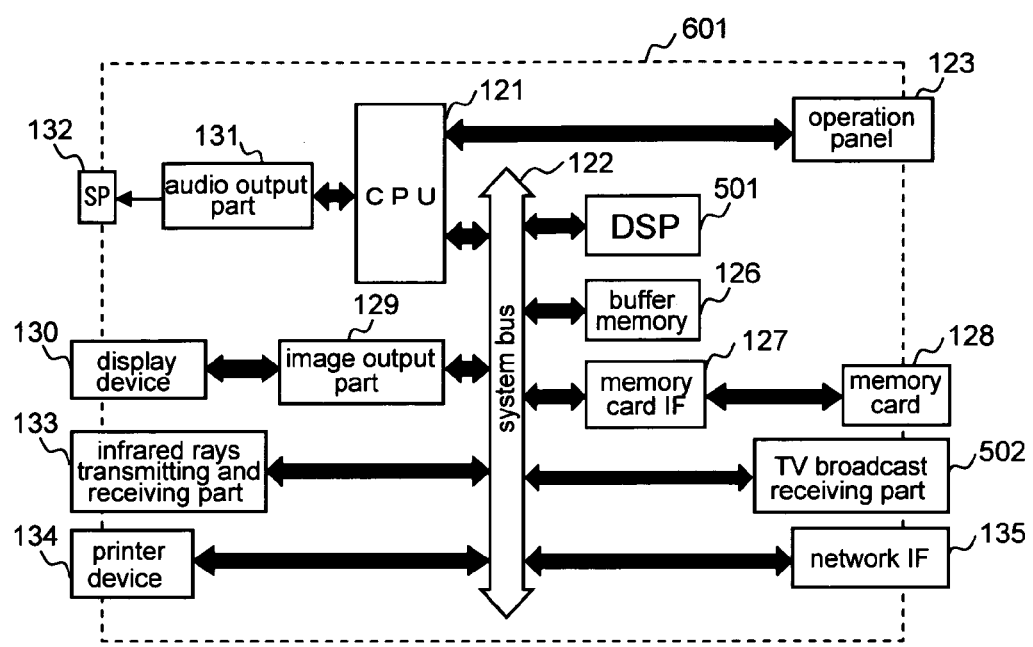
FIG. 12 is a block diagram of an image playback device according to Embodiment 5.

FIG. 12 is a block diagram of an image playback device according to Embodiment 5. It is noted that like reference numerals are used to refer to like elements used in Embodiments 1 and 2. The image playback device 601 of this embodiment corresponds to the image receiving part 103 or 153 of the aforementioned embodiments and does not include the transmitting and receiving part 125. In the image playback device 601, image data and audio data are externally input by using a memory card 128, the data is subjected to a reduction operation performed in a DSP 501 in accordance with the pixel number of a display device 130 or a printer device 134, and the resultant image is output to the display device 130 or the printer device 134.

The operation performed by a CPU 121 of this embodiment corresponds to the operation of the image receiving part 103 alone of the flowchart of Embodiment 1 shown in FIGS. 2 and 3. Specifically, the transmitting operations performed in S252 and S257 are replaced with a reading operation of file information from the memory card 128. Furthermore, the receiving operations performed in S253, S254 and S256 are replaced with a reading operation of file data from the memory card 128. In addition, the transmitting and receiving operations performed in S266 and S267 are replaced with a controlling operation of the memory card 128.

In this manner, in the image playback device 601 of this embodiment, since an image input from the memory card 128 is reduced in accordance with the pixel number of an image to be output from an image output part 129 and a buffer memory 126 holds at least two images, smooth transitional display can be performed.

Embodiment 6

In an image playback device 601 according to Embodiment 6, the architecture of Embodiment 5 shown in FIG. 12 is adopted, and an image is transmitted and received via a network instead of the transmitting and receiving parts 119 and 125 of Embodiments 1 through 4. In this case, an image transmitting part having a network IF and corresponding to the image transmitting part 102 or 152 is coupled to the image playback device 601 via a network IF 135, so as to transmit and receive image data, audio data and control data. An operation performed in this case is basically the same as that shown in the flowchart of each embodiment described above except that a communication part for images is changed from the wireless communication to network communication.

When the network is used instead of the wireless communication in this manner, an image can be reduced in accordance with the pixel number of an image to be output from an image output part 129 or the pixel number of a printer device 134 before transmission and reception, and therefore, the use efficiency of the network can be improved without spoiling the image quality.

The image playback devices according to the preferred embodiments of the present invention have been described so far, and it is noted that the same effects can also be attained when the display device 130 is not related to television images of the SDTV format, the HDTV format or the like but is a personal computer monitor with any of various resolutions of the VGA, the SVGA or the XGA. For example, when the display device 130 has the VGA resolution (that is, 640×480 pixels), the transmitting time can be largely reduced without degrading the quality of a displayed image by reducing a shot image of 3840×2160 pixels in the length and the breadth to approximately ⅕ before the transmission.

Embodiment 7

Figure 13:
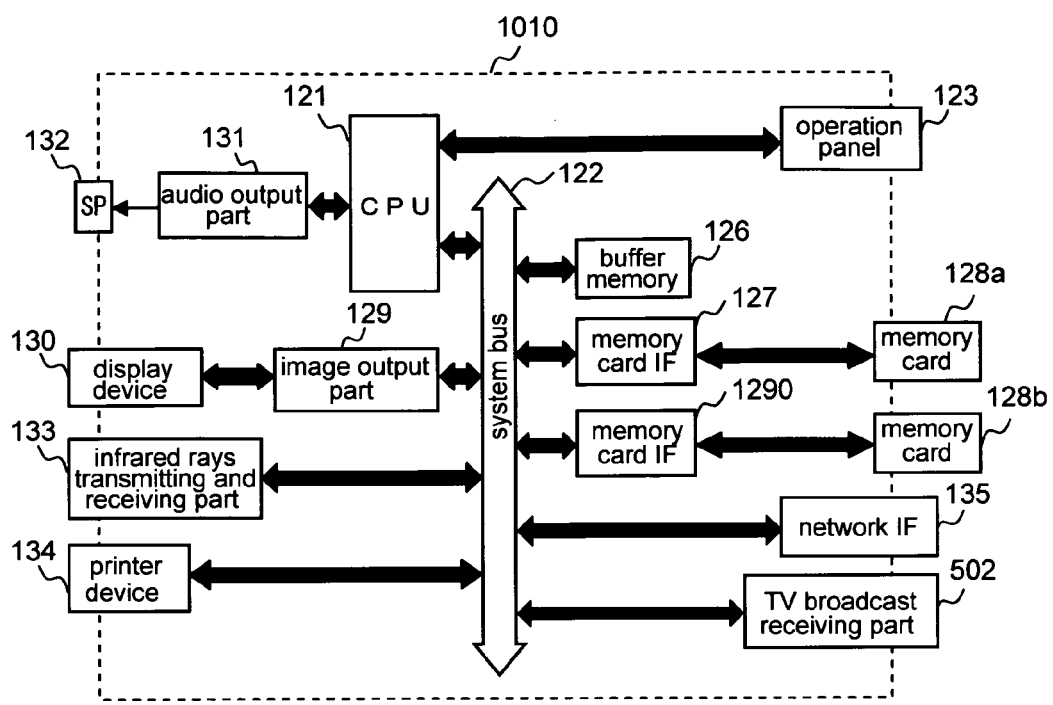
FIG. 13 is a block diagram of an image playback device according to Embodiment 7.

FIG. 13 is a block diagram of an image playback device 1010 according to Embodiment 7. The image playback device 1010 is used for performing a slide show with music, in which image data and audio (music) data stored in advance in a memory card 128*a* or a memory card 128*b* are read for successively displaying a plurality of images on a display device 130 while playing back music with a speaker (SP) 132 via an audio output part 131. The audio may be music, and music data is read for playing back music in this embodiment.

Like reference numerals are used in FIG. 13 to refer to like elements shown in FIG. 1. The image playback device 1010 includes a memory card IF 1290 in addition to the memory card IF 127 of FIG. 1, and both the two memory cards 128*a* and 128*b* can be used. Furthermore, in the same manner as in FIG. 1, an operation panel 123 to be operated by a user and the audio output part 131 for playing back music data are coupled to interfaces of a CPU 121 itself. An infrared rays transmitting and receiving part 133 is used for remotely performing the same operation with an infrared rays remote control (not shown) as that performed with the operation panel 123, and thus, the image playback device 1010 can be operated at a distance while watching the screen of the display device 130. In addition, the operation panel 123 can be operated by a user for printing an image displayed in the slide show with a printer device 134.

Before performing the slide show with music, the operation panel 123 is operated by a user for selecting image data and music data to be used in the slide show. For example, when the memory card 128*a* and the memory card 128*b* are respectively coupled to the memory card IF 127 and the memory card IF 1290, the CPU 121 automatically retrieves image data and music data stored in the memory cards, so that a list of folders storing image data and a list of music data can be displayed on the display device 130 via an image output part 129. While watching the screen of the display device 130, the user operates a cursor key (not shown) of the operation panel for selecting a folder storing desired image data and music data.

Figure 14A:
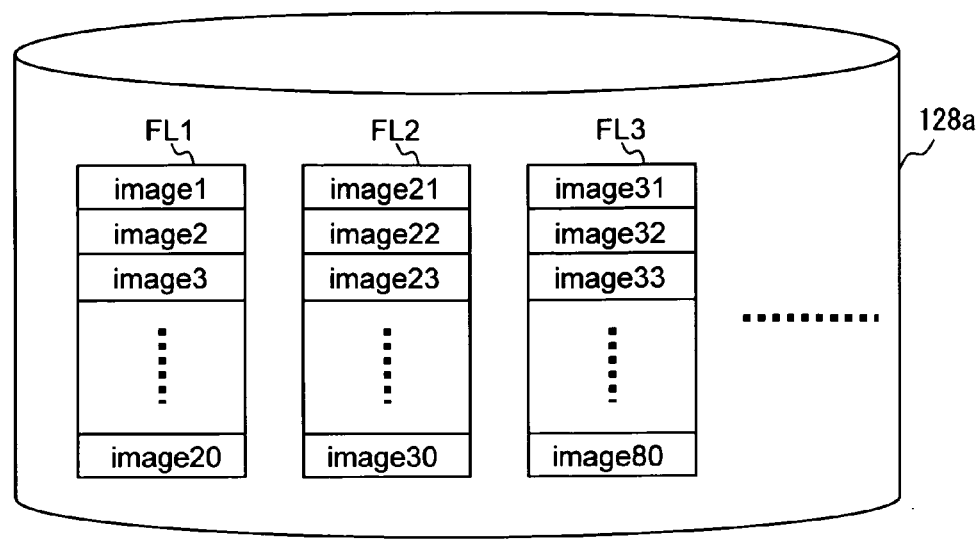
FIGS. 14(a) and 14(b) are explanatory diagrams showing an exemplified storage in memory cards 128a and 128b.
Figure 14B:
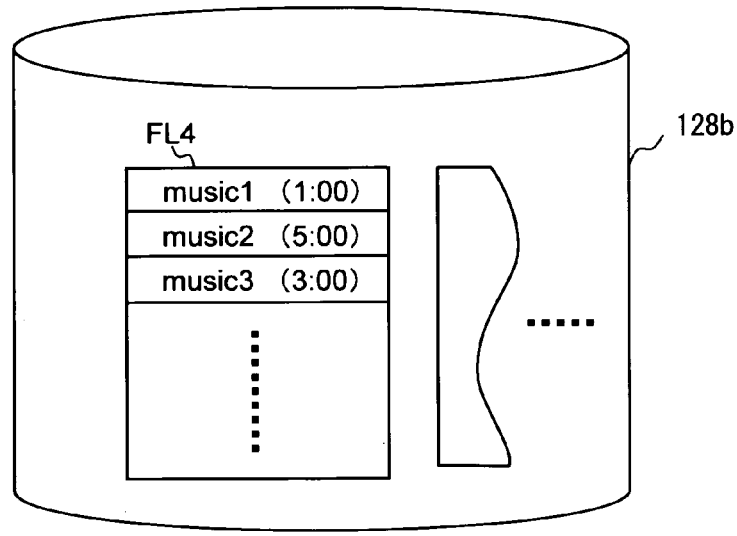

For example, assuming that a folder FL1 of the memory card 128*a* shown in FIG. 14(*a*) is selected, the CPU 121 reads a series of image data of images 1 through 20 held in the folder FL1 out to a buffer memory 126. Furthermore, assuming that music 1 of a folder FL4 of the memory card 128*b* shown in FIG. 14(*b*) is selected as music data, music data of the music 1 is read out to the buffer memory 126.

It is noted that the device can be coupled to the Internet through a network IF 135 so as to download music data or image data from a server provided on the Internet to the buffer memory 126 for use.

Now, the operation of the CPU 121 performed after starting the slide show will be described with reference to a flowchart of FIG. 15.

(Step S651) A user directs the start of the slide show through the operation panel 123.

(Step S652) Music data stored in the buffer memory 126 is acquired for making preparations for music playback. The music data may adopt any of the various formats of the MP3, AAC and WAV, and the playback operation is performed in accordance with the respective format. It is noted that the music data additionally includes information on playback time for playing back music.

(Step S653) The series of image data stored in the buffer memory 126 is acquired for making preparations for image display. At this point, the number of images to be output is calculated. In this embodiment, the number of image data read out to the buffer memory 126 is searched so as to check the number (N) of images to be displayed in the slide show. In selecting the folder FL1 of FIG. 14(*a*), the number N=20, and the number (N) increases when an image is added in the buffer memory 126. Furthermore, the image data may adopt any of the various formats of the JPEG and BMP, and the display operation is performed in accordance with the respective format.

(Step S654) Output time per image to be output to the display device 130 by the image output part 129 is calculated based on the playback time of the music data acquired in step S652 and the number (N) of the series of image data acquired in step S653.

Figure 16A:
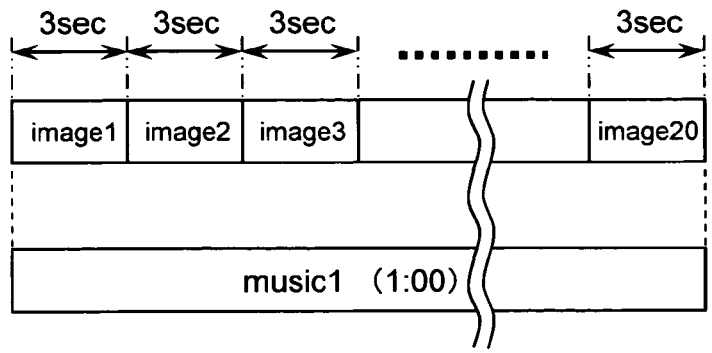
FIG. 16(a) to 16(c) are explanatory diagrams explaining the time relationship between music playback time and image displaying time.
Figure 16B:
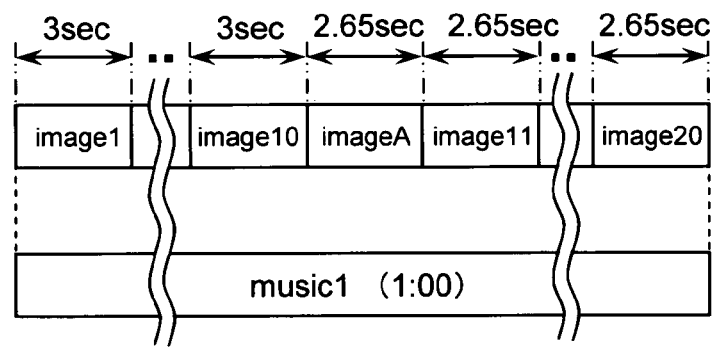
Figure 16C:
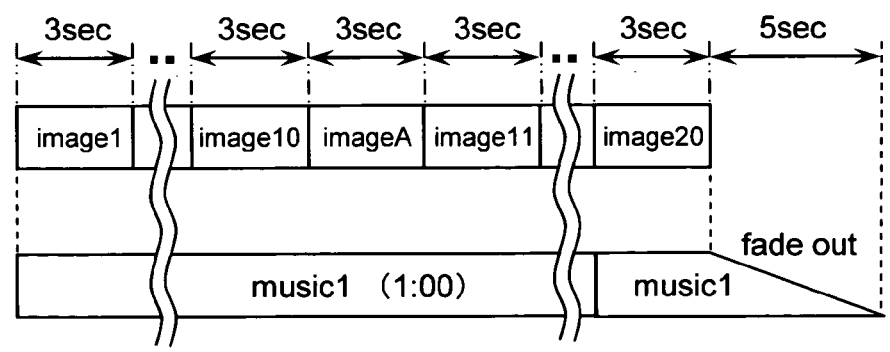

For example, the output time per image adopted in performing the slide show with music by using the image data of the 20 images of the folder FL1 of FIG. 14(*a*) and the music 1 of the folder FL4 of FIG. 14(*b*) is shown in FIG. 16(*a*). In this drawing, the horizontal axis corresponds to the time length, and when the 20 images of the images 1 through 20 are displayed in 1 minute, that is, the playback time of the music 1, 60 seconds÷20=3 seconds, and therefore, the display time per image is set to 3 seconds.

(Step S655) The number (N) of the series of images to be displayed in the slide show is set in an image output counter (n) (that is, n=N). In this embodiment, the image output counter (n) is decremented by 1 (that is, n=n−1) every time one image has been displayed, and when all the N images have been displayed, n=0 and the slide show is terminated.

(Step S656) It is checked whether or not image data has been newly added to the image data of the 20 images of the images 1 through 20 of the folder FL1 having been copied in the buffer memory 126. When image data has been newly added, the process proceeds to step S657, and when not, the process proceeds to step S659. Image data is newly added, for example, when the user downloads image data from the Internet via the network IF 135 by operating the operational panel 123, when image data is received through data telecast or the like from a TV broadcast receiving part 502, when an image 21 of another folder FL2 of the memory card 128*a* is selected and copied in the buffer memory 126, or when another memory card is coupled instead of the memory card 128*a* so as to automatically load an image into the buffer memory 126.

(Step S657) When the image data is newly added in the buffer memory 126, display time per image is recalculated based on the remaining number of the images from an image to be displayed next to an image to be displayed finally in the slide show and remaining playback time of the music data to be played back while displaying the remaining images.

For example, FIG. 16(*b*) is a diagram for showing the relationship between the playback time of the music 1 and the display time of a series of images obtained when an image A is newly added in the middle of the display of the 10th image. In this drawing, before the image A is added, 10 images of the images 1 through 10 are displayed for 3 seconds each, that is, for 30 seconds in total, and therefore, the remaining playback time of the music 1 is 60 seconds−30 seconds=30 seconds. On the other hand, the number of remaining images to be displayed is 11 in total, that is, 10 images of the images 11 through 20 and the additional image A. Accordingly, display time per remaining image is 30 seconds÷11≈2.65 seconds, and hence, the display time per image is re-set from 3 seconds to 2.65 seconds.

(Step S658) Since one image is added to be displayed, the image output counter (n) corresponding to the number of remaining images is incremented by 1. For example, in FIG. 16(*b*), n is increased from 10 to 11.

(Step S659) Image data of an nth image corresponding to the image output counter (n) is read and displayed on the display device 130 for a prescribed time. For example, in FIG. 16(*b*), the image A is displayed for 2.65 seconds. Since the processing of step S659 is separately performed as an interruption operation or an event-driven operation, the process does not stop at step S659 for 2.65 seconds but proceeds to next step S660.

Figure 17A:
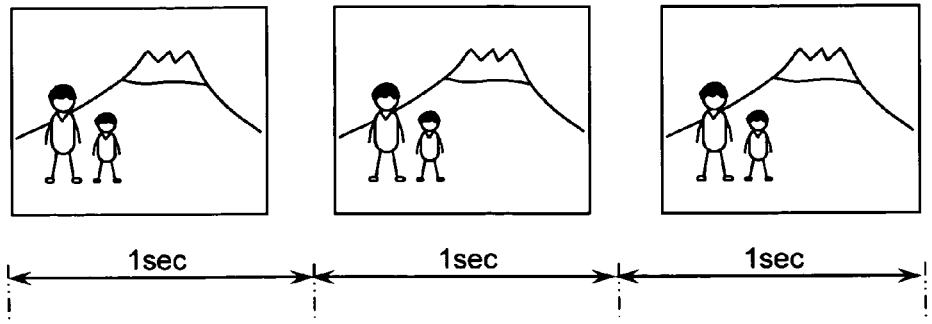
FIG. 17(a) to 17(c) are explanatory diagrams showing an exemplified image display.
Figure 17B:
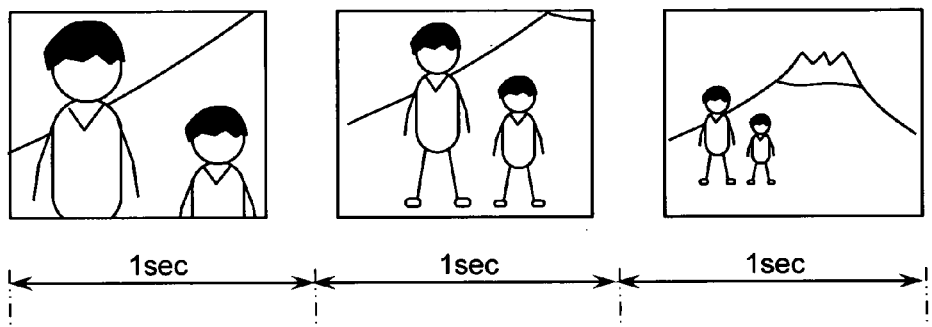
Figure 17C:
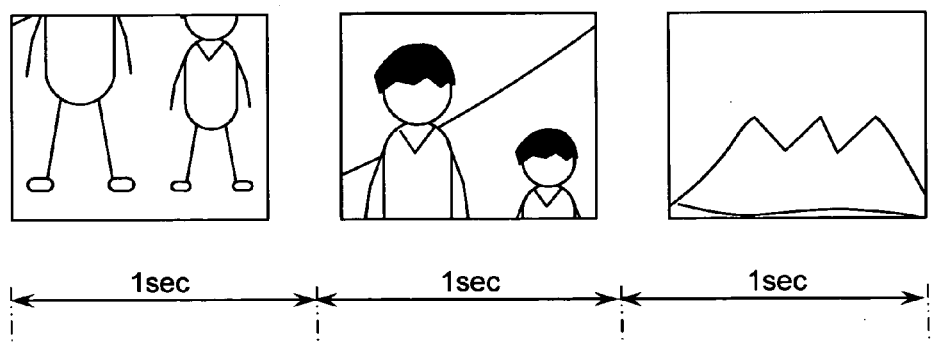

Now, a method for displaying one image for a prescribed time will be described with reference to FIG. 17. In FIG. 17, images to be displayed in respective seconds are discretely shown for explaining the change of images to be displayed for 3 seconds, and actually, the displayed images are gradually changed among the respective images. In FIG. 17(*a*), the same area of the same image is continuously displayed, and the image displayed for 3 seconds is not changed. On the contrary, the area of an image to be displayed is changed in this embodiment as shown in FIG. 17(*b*) or 17(*c*). For example, in FIG. 17(*b*), an image is first zoomed in so as to display only a part of the image and is gradually zoomed out so as to display the whole image 3 seconds after. Alternatively, in FIG. 17(*c*), an image is first zoomed in so as to display only a part of the image and a displaying area is gradually moved (panned) so as to display various areas of the one image.

(Step S660) It is judged whether or not the operation panel 123 has been operated by the user for a termination operation. When the termination operation has been performed, the process proceeds to S661, and when not, the process proceeds to S662.

(Step S661) When the termination operation has been performed by the user, the slide show operation is terminated.

(Step S662) When the termination operation has not been performed by the user, the slide show operation is continuously performed, and the image output counter (n) is decremented by 1, that is, n=n−1.

(Step S663) It is judged based on the value of the image output counter (n) whether or not the image is a final image to be displayed in the slide show. Specifically, when n=0, the image is the final image, and hence the process proceeds to step S661, so as to terminate the slide show with the currently displayed image. When n≠0, the image is not the final image, and hence the process proceeds to step S656, so as to repeat a similar operation until n=0.

In this manner, in the image playback device 1010 of this embodiment, even when an image is newly added in the middle of a slide show with music, the display time for remaining images is recalculated to be re-set without suspending the slide show, and therefore, the slide show can be terminated in accordance with the playback time of music. As a result, there is no need to suspend a slide show during appreciation every time a new image is added. Furthermore, the playback of the music does not terminate prior to the end of the image display, and the music playback can be terminated naturally in accordance with the end of the image display.

In addition, in displaying images in a slide show, a displaying area is changed in one image instead of displaying the same area of the same image for a prescribed time, and therefore, the slide show can be enjoyed as if it were dynamic images.

Although the slide show with music is described in this embodiment, the present invention is applicable to a slide show with no audio playback. Specifically, a slide show is started after selecting images to be used in the slide show, and when a new image is added in the middle of the playback of the slide show, the additional image is immediately inserted into the slide show. The additional image may be inserted after a currently displayed image or after displaying all the images.

Embodiment 8

An image playback device according to Embodiment 8 will now be described. The image playback device of this embodiment has the same architecture as the image playback device 1010 of Embodiment 7 shown in FIG. 13 but the operation performed by the CPU 121 is different. Although each of a series of images is displayed once in the slide show in Embodiment 7, one image is displayed a plurality of times in this embodiment. The operation performed by the CPU 121 of this embodiment will now be described with reference to a flowchart of FIG. 18. Like reference numerals are used to refer to like steps shown in FIG. 15 so as to omit description.

In processing performed from step S651 to step S653, a series of image data and music data to be used in a slide show are acquired and stored in the buffer memory 126.

(Step S751) A user inputs, through the operation panel 123, the number (M) of times for repeatedly displaying each image of the series of image data, and the repeat number (M) is set as an initial value of a repeat counter m. In this embodiment, the repeat counter m is decremented by 1 every time one repetition is completed, and when M repetitions have been completed, m=0, and the slide show with music is terminated.

(Step S752) Output time per image to be output to the display device 130 by the image output part 129 is calculated based on the repeat number (M) set in step S751, playback time of the music data and the number (N) of images of the series of image data.

For example, it is assumed that the repeat number set in step S751 is 2 and that image data of 10 images of images 21 through 30 of a folder FL2 of FIG. 14(*a*) and the music 1 of the folder FL4 of FIG. 14(*b*) are selected in advance to be stored in the buffer memory 126. The number of images to be displayed in the slide show is 20 because the display of the 10 images is repeated twice. On the other hand, since the playback time of the music 1 is 1 minute, in order to display the 10 images of the images 21 through 30 repeatedly twice, the display time per image is set to 3-seconds because 60 seconds÷20=3 seconds. The time relationship between the images and the music used in the slide show is the same as that shown in FIG. 16(*a*) described in Embodiment 7 except that the image data of the 20 images of the images 1 through 20 is replaced with the two display repetitions of the image data of the 10 images of the images 21 through 30.

Figure 15:
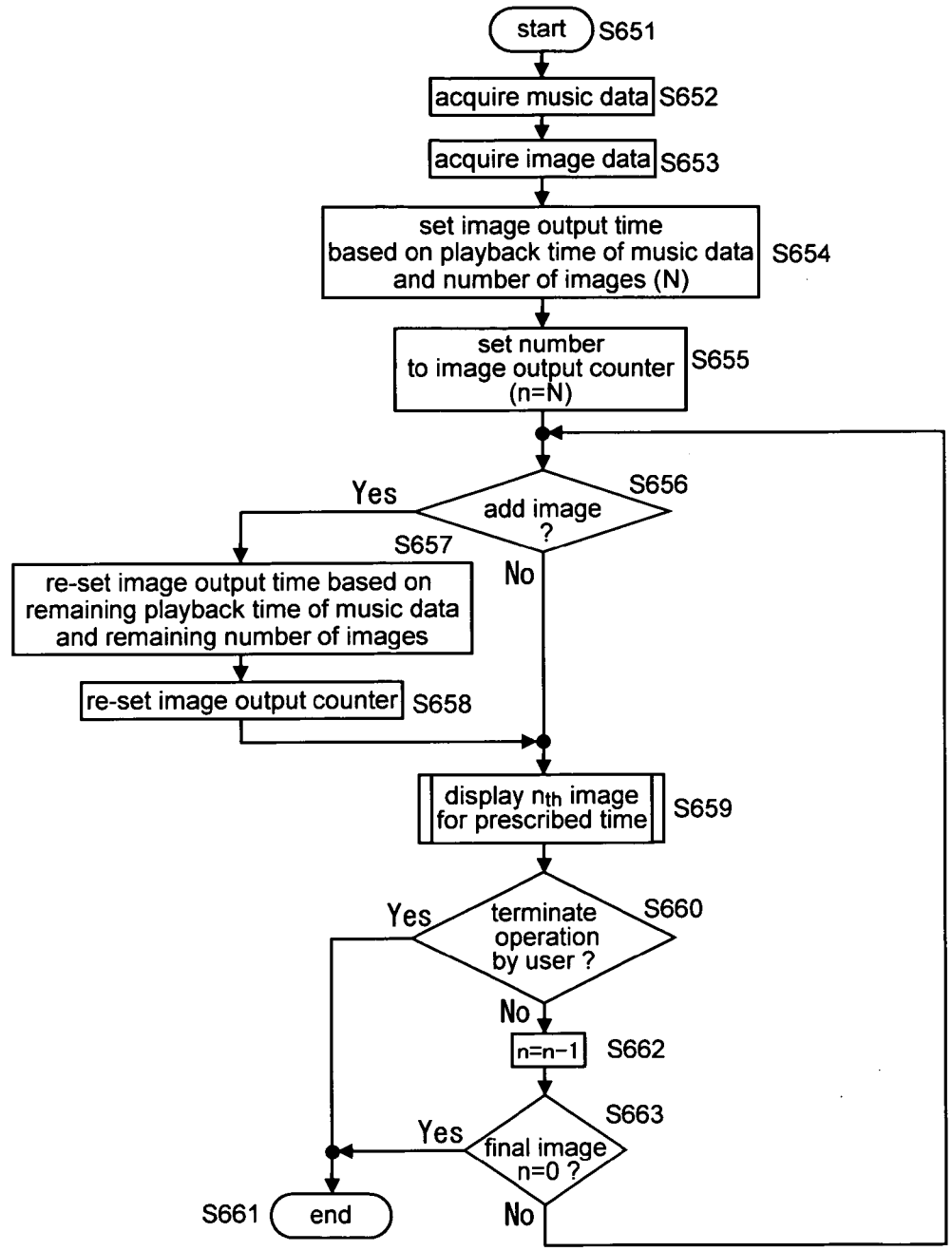
FIG. 15 is a flowchart for the image playback device according to Embodiment 7.

Next processing performed in steps S655 and S656 is the same as that of Embodiment 7 shown in FIG. 15.

(Step S753) When new image data is added in the buffer memory 126, display time per image is recalculated based on the repeat number, the number of remaining images to be displayed from an image to be displayed next to an image to be displayed finally in the slide show and remaining playback time of the music data to be played back during the display of the remaining images. For example, when new image data is added during display of the 10th image of the first repetition, the number of images to be displayed in the second display repetition is increased by 1 to 11, and the display time per image is approximately 2.65 seconds. This is the same as the case of FIG. 16(*b*) described in Embodiment 7.

When image data of 5 images is newly added during display of the 5th image of the first repetition, however, the number of images to be displayed after the addition is as follows:
(Number of remaining images of first repetition): The newly added 5 images and the remaining 5 images of the first repetition, that is, 10 in total.
(Number of images to be displayed in second repetition): The original 10 images and the newly added 5 images, that is, 15 in total.
Accordingly, the number of images to be displayed after the addition of the new image data of the 5 images is 25. On the other hand, before the addition of the new images, the five images have been displayed for 3 seconds each, that is, for 15 seconds in total, and therefore, the remaining playback time of the music 1 is 45 seconds. Since the 25 images should be displayed in 45 seconds, the display time per image is 45 seconds÷25=1.8 seconds.

(Step S754) It is checked whether or not the display time per image recalculated in step S753 is smaller than a prescribed value, and when it is smaller than the prescribed value, the process proceeds to step S755, and when it is larger than the prescribed value, the process proceeds to step S756.

Assuming that the prescribed value is, for example, 2 seconds, when new image data is added during the display of the 10th image of the first repetition in the aforementioned case, the display time per image is approximately 2.65 seconds, which is larger than the prescribed value.

When the image data of 5 images is newly added during the display of the 5th image of the first repetition in the aforementioned case, however, the display time per image is approximately 1.8 seconds, which is smaller than the prescribed value, and therefore, the display time should be adjusted again. In other words, this operation is performed for preventing the display time per image from being too short and the slide show from being unnatural.

(Step S755) When the display time per image is too short, the repeat number is reduced. In the aforementioned case, the display time per image is approximately 1.8 seconds, and hence, the second repetition is omitted, and the process returns to step S753 so as to recalculate the display time per image. Specifically, the number of remaining images is a sum of the newly added 5 images and the remaining images of the first repetition, that is, in total. On the other hand, the remaining playback time of the music 1 is 45 seconds, and hence, the display time per image is recalculated to be 4.5 seconds.

(Step S756) When the display time per image recalculated in step S753 is larger than the prescribed value, the number (N) of images to be displayed in one repetition is re-set, the image output counter (n) is re-set and the calculated display time per image is re-set.

Next processing performed from step S659 to step S663 is the same as that of Embodiment 7 shown in FIG. 15. In step S663, however, when the image is a final image of the first repetition, the process proceeds to step S757.

(Step S757) The repeat number counter (m) is decremented by 1, that is, m=m−1.

(Step S758) It is judged based on the value of the repeat number counter (m) whether or not the image is a final image to be displayed in the slide show. Specifically, when m=0, the image is the final image of the final repetition, and hence, the process proceeds to step S661, and the slide show is terminated with the currently displayed image. When m≠0, it is not the final repetition, and the process returns to step S656 so as to repeat a similar operation until m=0.

In this manner, in the image playback device 1010 of this embodiment, even when an image is newly added in the middle of a slide show with music in which a series of images are repeatedly displayed a plurality of times, display time for remaining images is recalculated to be set without suspending the slide show, and therefore, the slide show can be terminated in accordance with the playback time of music. In particular, when the display time per remaining image is too short, the repeat number is reduced so as to attain a display time exceeding a prescribed value, and therefore, the slide show can be appreciated while naturally displaying images without causing a sense of discomfort.

Embodiment 9

An image playback device according to Embodiment 9 will now be described. The image playback device of this embodiment has the same architecture as the image playback device 1010 of Embodiments 7 and 8 shown in FIG. 13 but the operation performed by the CPU 121 is different. In particular, in the flowchart of FIG. 18 of Embodiment 8, the processing performed in step S755 is different, and specifically, the repeat number is not reduced but an original image is deleted, so as to make the display time per image larger than the prescribed value.

Now, the operation performed by the CPU 121 of this embodiment will be described with reference to a flowchart of FIG. 19. Like reference numerals are used to refer to like steps shown in FIG. 18 so as to omit description.

Figure 18:
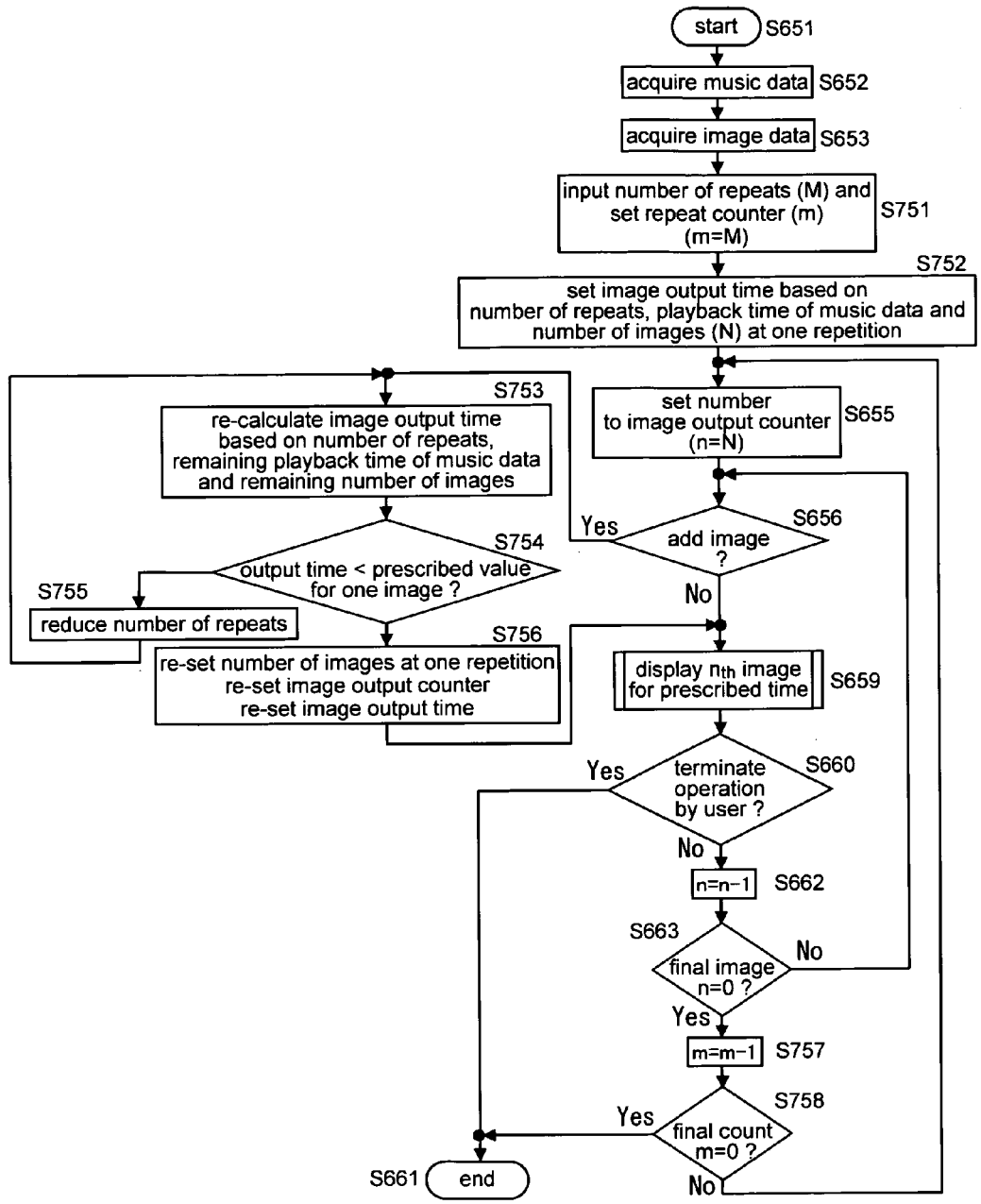
FIG. 18 is a flowchart for an image playback device according to Embodiment 8.
Figure 19:
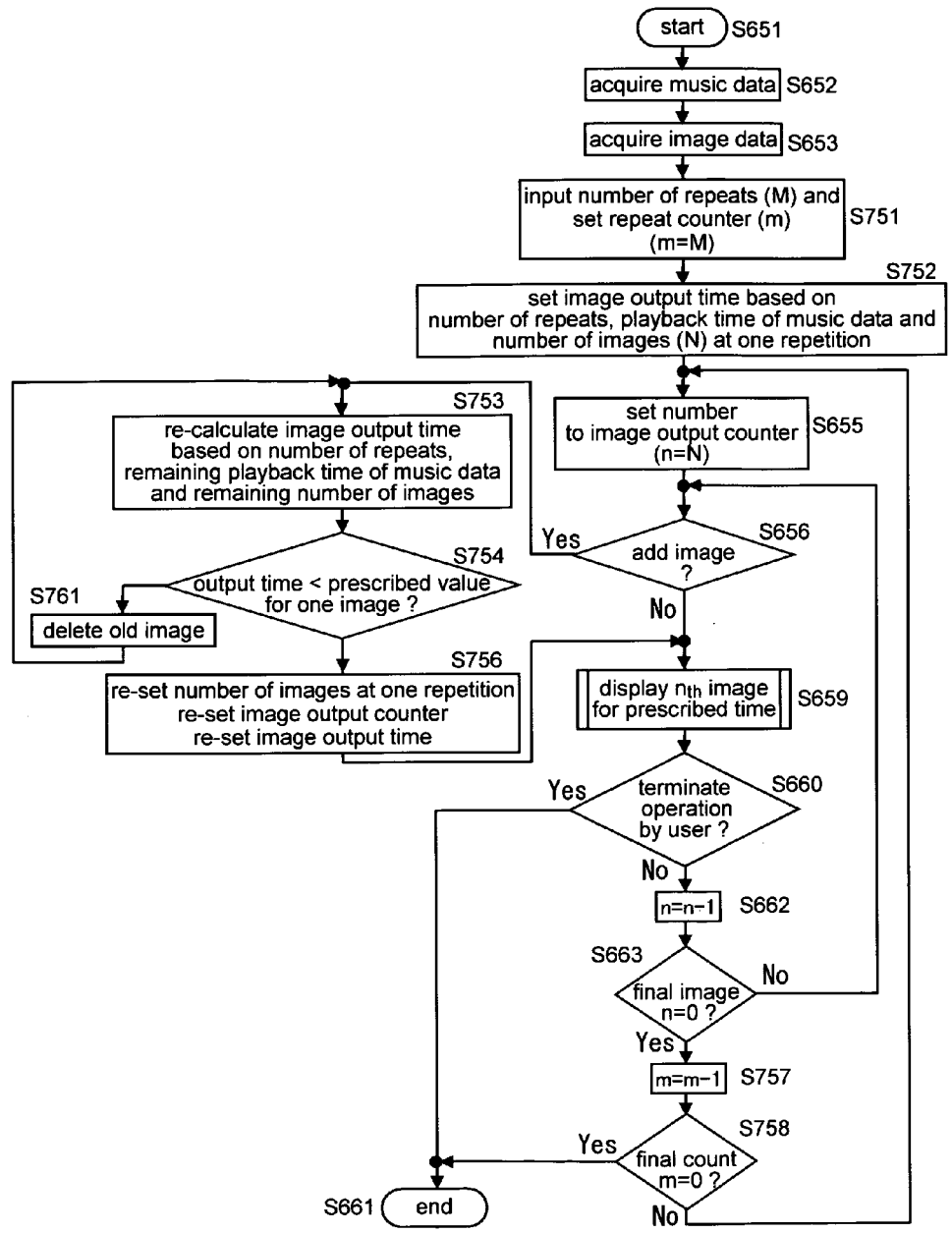
FIG. 19 is a flowchart for an image playback device according to Embodiment 9.

The operation is started in step S651, and processing performed up to step S754 where it is judged whether or not the display time per image recalculated after addition of a new image is larger than a prescribed value is the same as that of Embodiment 8 shown in FIG. 18.

(Step S761) When the display time per image is too short, any of the original series of images is deleted. For example, when the new image data of the 5 images is added during the display of the 5th image of the first repetition in the case exemplified in Embodiment 8, the display time per image is approximately 1.8 seconds, and therefore, one image is deleted from the remaining images of the first repetition. In this case, the number of images to be displayed after the addition is as follows:

(Number of remaining images of first repetition): A sum of the newly added 5 images and the remaining (5−1) images of the first repetition, that is, 9 in total. It is noted that −1 corresponds to the number of a deleted image.

(Number of images to be displayed in second repetition): A sum of the original (10−1) images and the newly added 5 images, that is, 14 in total. It is noted that −1 corresponds to the number of a deleted image.

As a result, the number of images to be displayed after the addition of the new image data of the 5 images is 23. On the other hand, as described in Embodiment 8, the remaining playback time of the music 1 is 45 seconds, and therefore, the display time per image is 45 seconds÷23≈1.95 seconds. In this case, since the display time is still smaller than the prescribed value of 2 seconds, the process returns from step S754 to step S761, so as to delete another image. In this case, the number of images to be displayed after the addition is as follows:

(Number of remaining images of first repetition): A sum of the newly added 5 images and the remaining (5−2) images of the first repetition, that is, 8 in total. It is noted that −2 corresponds to the number of deleted images.

(Number of images to be displayed in second repetition): A sum of the original (10−2) images and the newly added 5 images, that is, 13 in total. It is noted that −2 corresponds to the number of deleted images.

Accordingly, the number of images to be displayed after the addition of the new image data of the 5 images is 21, and the remaining playback time of the music 1 is 45 seconds, and therefore, the display time per image is 45 seconds÷21≈2.14 seconds.

When the display time per image recalculated in step S753 is larger than the prescribed value, processing performed thereafter is the same as that of Embodiment 8 shown in FIG. 18, and hence, the description is omitted.

In this manner, in the image playback device 1010 of this embodiment, even when an image is newly added during a slide show with music in which a series of images are repeatedly displayed a plurality of times, display time for remaining images is re-set by deleting any of the remaining original images without suspending the slide show, and therefore, the slide show can be terminated in accordance with the playback time of music. In particular, when the display time per remaining image is too short, any of the remaining original images is deleted so as to attain a display time exceeding a prescribed time, and therefore, the slide show can be appreciated while naturally displaying images without causing a sense of discomfort. It is noted that the original images in the same number as newly added images may be deleted in this embodiment. In this case, the total number of images to be displayed in the slide show is unchanged, and therefore, the operation can be performed in the display time per image first calculated.

Embodiment 10

An image playback device according to Embodiment 10 will now be described. The image playback device of this embodiment has the same architecture as the image playback device 1010 of the aforementioned embodiment shown in FIG. 13 but the operation of the CPU 121 is different. In particular, in the flowchart of FIGS. 18 and 19 of Embodiments 8 and 9, different processing is performed in step S755 or S761, so that the display time per image is made to be larger than a prescribed value by adding music data.

The operation of the CPU 121 of this embodiment will now be described with reference to a flowchart of FIG. 20. Like reference numerals are used to refer to like steps of FIGS. 18 and 19 so as to omit description.

The operation is started in step S651, and processing performed up to step S754 where it is judged whether or not the display time per image recalculated after the addition of a new image is larger than a prescribed value is the same as that of Embodiments 8 and 9.

(Step S771) When the display time per image is too short, music data is added. For example, when the new image data of the 5 images is added during the display of the 5th image of the first repetition in the case exemplified in Embodiment 8, the display time per image is approximately 1.8 seconds, and therefore, the music data of the same music 1 is added as a second music track.

Thereafter, the display time per image is recalculated again in step S753. In the aforementioned case, since the remaining playback time of the first music track obtained when the new image data of the 5 images is added is 45 seconds, the playback time is calculated as 105 seconds by adding 60 seconds of the second music track. On the other hand, the number of images to be displayed after the addition of the new image data of the 5 images is 25 as described in Embodiment 8, and therefore, the display time per image is 105 seconds÷25=4.2 seconds, which satisfies the condition of the prescribed value.

The processing performed after the display time per image recalculated in step S753 is larger than the prescribed value is the same as that of Embodiment 8 shown in FIG. 18, and hence, the description is omitted.

In this manner, in the image playback device 1010 of this embodiment, even when an image is newly added in the middle of a slide show with music, display time for remaining images is re-set without suspending the slide show, and therefore, the slide show can be terminated in accordance with the playback time of the music. In particular, when the display time per remaining image is too short, music to be played back is newly added so as to attain a display time exceeding a prescribed value, and therefore, the slide show can be appreciated while naturally displaying images without causing a sense of discomfort.

Although the second music track is added in this embodiment, the playback time may be increased correspondingly to the display time for an added image by lowering the playback pitch of the first music track without adding the second music track. The playback pitch can be controlled by increasing the fundamental period of sound by copying, and thus, the playback time can be increased without changing the interval.

Furthermore, although the same music track is added in this embodiment, another music track different from the first music track may be added.

Embodiment 11

An image playback device according to Embodiment 11 will now be described. The image playback device of this embodiment has the same architecture as the image playback device 1010 shown in FIG. 13 but the operation of the CPU 121 is different. In particular, in the flowchart of Embodiment 10 shown in FIG. 20, when a new image is added in step S656, the display time for images and the playback time of music are not re-set in this embodiment.

The operation of the CPU 121 of this embodiment will now be described with reference to a flowchart shown in FIG. 21. Like reference numerals are used to refer to like steps of FIG. 20 so as to omit description.

The operation is started in step S651, and processing performed until addition of a new image is the same as that of Embodiment 10.

(Step S781) When a new image is added, music data is added. For example, the music data of the same music 1 is added as a second music track.

(Step S782) Since the new image is added, the number (N) of images of every repetition and the image output counter n of the current repetition are re-set. For example, when 3 images are added, the number N is set to N+3 and the image output counter n is set to n+3.

Figure 20:
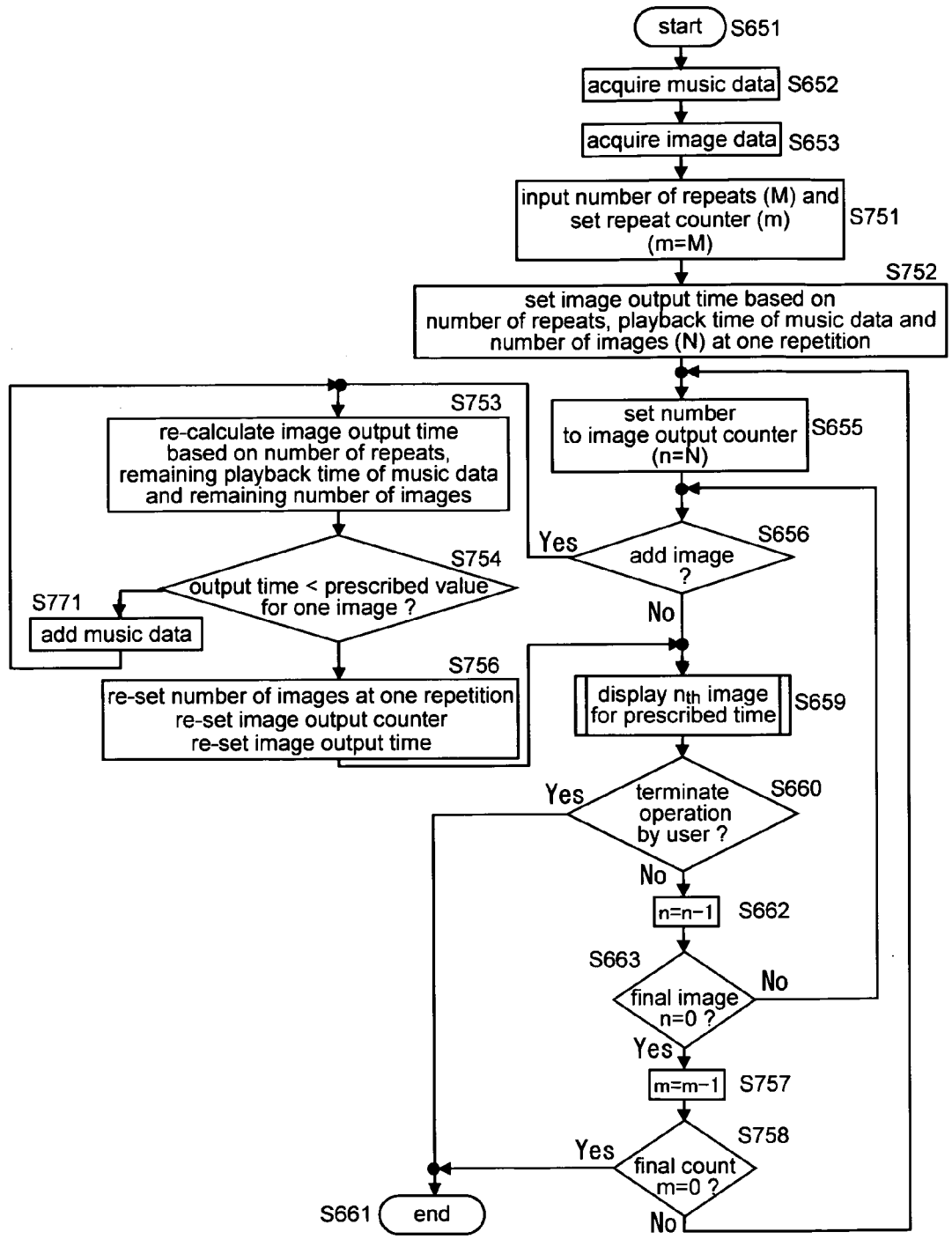
FIG. 20 is a flowchart for an image playback device according to Embodiment 10.
Figure 21:
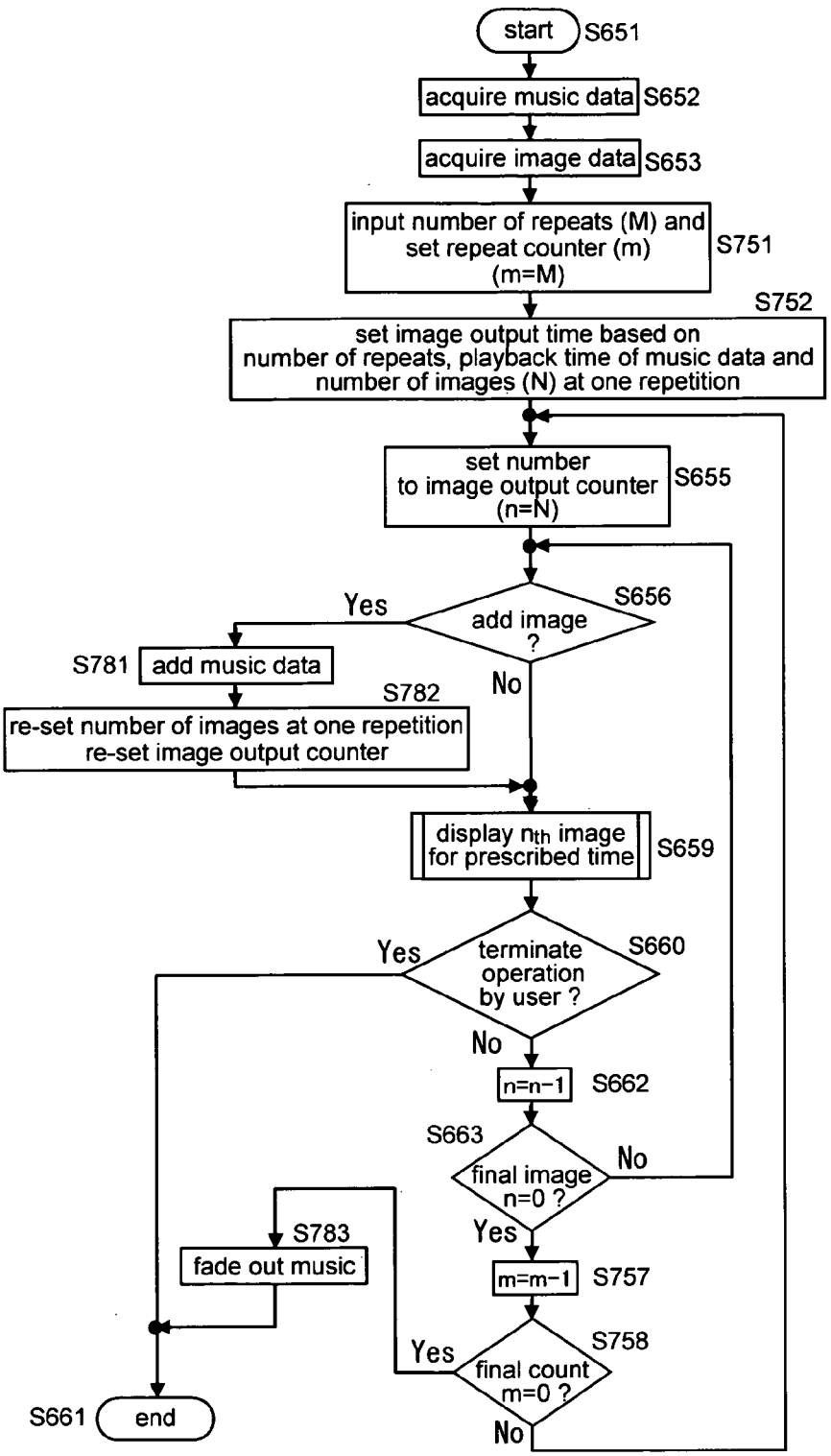
FIG. 21 is a flowchart for an image playback device according to Embodiment 11.

An operation performed after step S659 is the same as that of Embodiment 10 shown in FIG. 20, but the processing performed when the image is judged to be a final image of the slide show in step S758 is different, and the process proceeds to step S783.

(Step S783) When the image is judged to be a final image of the slide show, the sound volume of the music played back is gradually lowered and faded out before starting the termination operation of step S661. The fade-out can be realized by providing the audio output part 131 with an electronic controlled volume to be controlled by the CPU 121.

In this manner, in the image playback device 1010 of this embodiment, even when a new image is added in the middle of a slide show with music, the slide show can be continuously performed without being suspended. In particular, since the music played back is faded out in terminating the display of a final image of the slide show, the slide show can be terminated naturally without causing a sense of discomfort.

Embodiment 12

Figure 22:
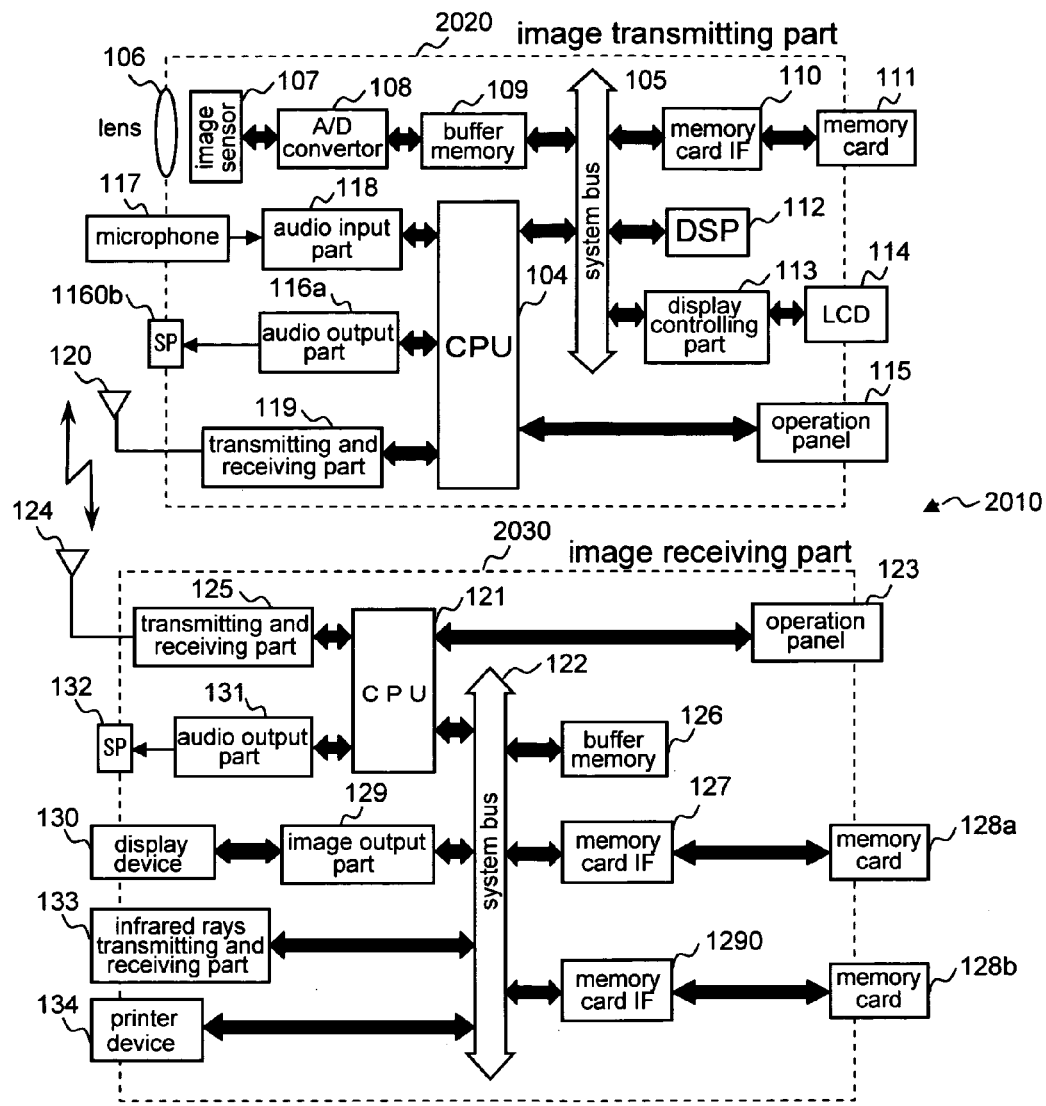
FIG. 22 is a block diagram of an image playback device according to Embodiment 12.

An image playback device according to Embodiment 12 will now be described. The image playback device 2010 of this embodiment shown in FIG. 22 is obtained by providing the image playback device 1010 of FIG. 13 with an antenna 124 and a transmitting and receiving part 125 for receiving shot images sent from an image transmitting part 2020 as shown in FIG. 1. Like reference numerals are used in FIG. 22 to refer to like elements shown in FIG. 1 so as to omit description.

The image playback device 2010 includes the image transmitting part 2020 and an image receiving part 2030. The image transmitting part 2020 has a camera function and wirelessly transmits shot images or images having been already shot to the image receiving part 2030, and the image receiving part 2030 displays received images or images having been already received successively on a display device 130.

Differently from FIG. 1, the shutter button 116 is omitted and included in an operation panel 115, and an audio output part 1160a and a speaker (SP) 1160b are provided so that a CPU 104 can read music data from a memory card 111 for playing back music in the same manner as performed with the audio output part 131 and the speaker 132 of FIG. 1.

In the same manner as in FIG. 1, audio (music) is input through a microphone 117 and is converted into digital data in an audio input part 118, and resultant data is stored by the CPU 104 in a buffer memory 109 or the memory card 111 together with image data. An audio input terminal may be provided instead of the microphone 117 for recording music from an audio device. Alternatively, music data or already shot image data may be input by using the memory card 111. Furthermore, the CPU 104 wirelessly transmits shot image data to the image receiving part 2030 through a transmitting and receiving part 119 and an antenna 120.

Next, the architecture of the image receiving part 2030 will be described. The image receiving part 2030 has the same architecture as the image playback device 1010 of Embodiments 7 through 11 shown in FIG. 13 except that the antenna 124 and the transmitting and receiving part 125 are provided for receiving shot images sent from the image transmitting part 2020, and when shot image data is received from the image transmitting part 2020 in the middle of a slide show, a CPU 121 adds the received data as a new image to be displayed in the slide show.

Figure 23:
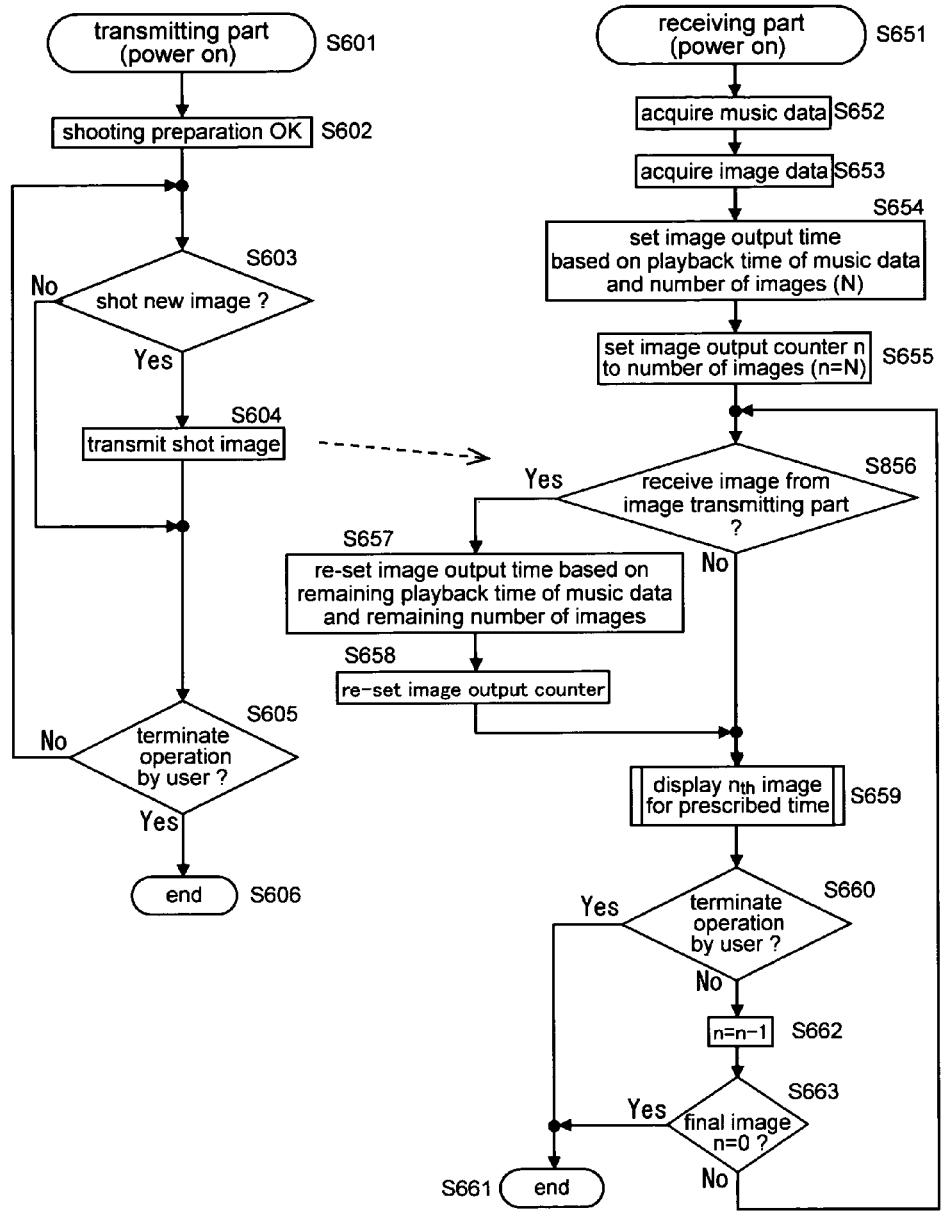
FIG. 23 is a flowchart for the image playback device according to Embodiment 12.

The operation of the image transmitting part 2020 will now be described with reference to a flowchart of FIG. 23.

(Image transmitting part: S601) The operation panel 115 is operated to turn on the image transmitting part 2020.

(Image transmitting part: S602) Shooting preparations are made for converting a subject image formed on an imaging sensor 107 via a lens 106 into a digital signal by an A/D converter 108 and storing the digital signal in the buffer memory 109.

(Image transmitting part: S603) It is determined whether or not a new image has been shot by pushing down the shutter button (not shown) of the operation panel 115. When a new image has been shot, the process proceeds to step S604. When a new image has not been shot, the process proceeds to step S605.

(Image transmitting part: S604) The CPU 104 reads image data of the newly shot image from the buffer memory 109, modulates it in the transmitting and receiving part 119 and wirelessly transmits the resultant to the image receiving part 2030 via the antenna 120.

(Image transmitting part: S605) It is determined whether or not a user has performed a termination operation by using the operation panel 115. When the user has performed the termination operation, the process proceeds to step S606, and when not, the process returns to step 5603.

(Image transmitting part: S606) When the user has performed the termination operation, the series of operations is terminated and the device is turned off.

Next, the operation of the image receiving part 2030 will be described. The operation of the image receiving part 2030 is substantially the same as that of the image playback device 1010 according to Embodiment 7 but is different in the processing performed in step S656 of FIG. 15. When the image receiving part 2030 is turned on in step S651, it is placed in a state where an image sent from the image transmitting part 2020 can be received.

(Image receiving part: S856) It is checked by the CPU 121 whether or not a new image has been received from the image transmitting part 2020 via the antenna 124 and the transmitting and receiving part 125 during display of images in a slide show. When a new image has been received, the process proceeds to step S657, and when not, the process proceeds to step S659. It is noted that an image received at this point is added for storage to the image data stored in the buffer memory 126.

Processing performed after next step S657 is performed in the same manner as in FIG. 15 of Embodiment 7.

Although the operation of the image receiving part 2030 is described to be the same as that of the image playback device 1010 described in Embodiment 7, the operation may be performed in the same manner as in the image playback device 1010 described in Embodiments 8 through 11 except that a new additional image is received from the image transmitting part 2020.

In this manner, in the image playback device 2010 of this embodiment, even when a new image is received from the image transmitting part 2020 in the middle of a slide show with music performed by the image receiving part 2030, the received image is inserted to be displayed with display time for the images re-set without suspending the slide show, and therefore, the slide show can be terminated in accordance with the playback time of the music.

Embodiment 13

Figure 24:
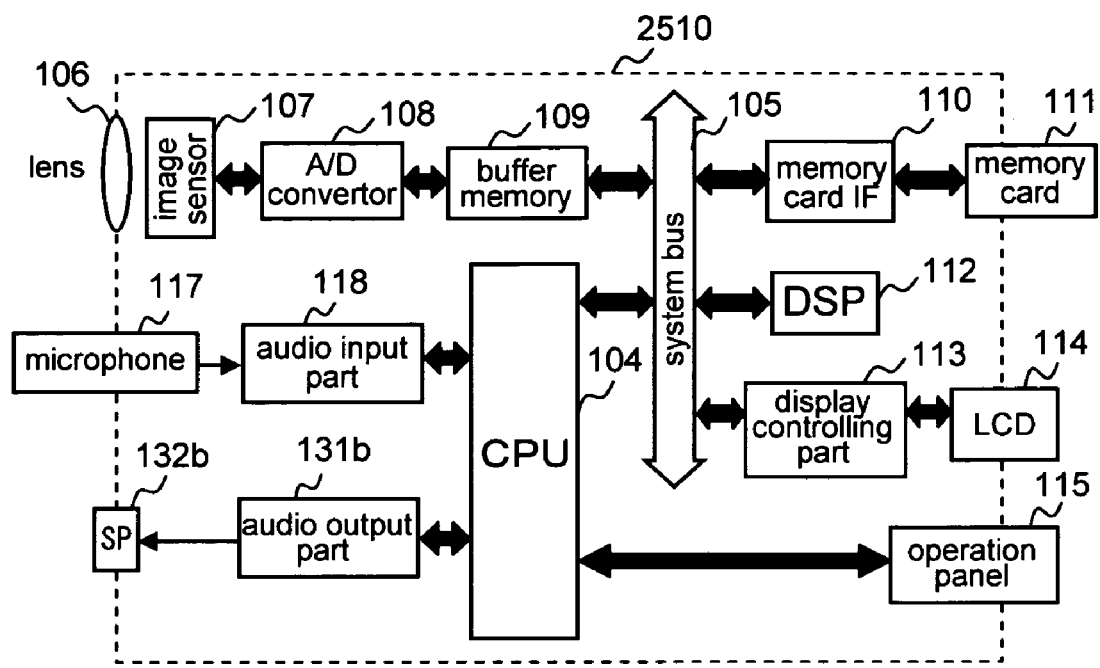
FIG. 24 is a block diagram of a camera including an image playback device according to Embodiment 13.

A camera including an image playback device according to Embodiment 13 will now be described. The camera 2510 of this embodiment shown in FIG. 24 is obtained by removing the antenna 120 and the transmitting and receiving part 119 from the image transmitting part 2020 of the image playback device 2010 of Embodiment 12 shown in FIG. 22 and by providing an audio output part 131b and a speaker (SP) 132b.

The camera 2510 stores image data and music data in a memory card 111 instead of the memory card 128a and the memory card 128b of Embodiment 12, so that music can be played back from the speaker 132b via the audio output part 131b while displaying a series of images on a liquid crystal monitor 114 via a display part 113.

A series of images to be displayed in the slide show are once read out into a buffer memory 109 from the memory card 111 as in the buffer memory 126 of Embodiment 7, and the number of images stored in the buffer memory 109 is managed by a CPU 104 as the number of images to be displayed in the slide show. Accordingly, when a new image is added in the buffer memory 109, the number of images to be displayed in the slide show is increased. Specifically, when a user shoots a new image by pushing down a shutter button (not shown) of an operation panel 115 in the middle of the slide show, the newly shot image is stored in the buffer memory 109, and the CPU 104 adds this image to be displayed in the slide show. At this point, the camera may be coupled to a television receiver or the like by providing an external output terminal instead of the liquid crystal monitor 114 and the speaker 132b for appreciation of a slide show with music.

Figure 25:
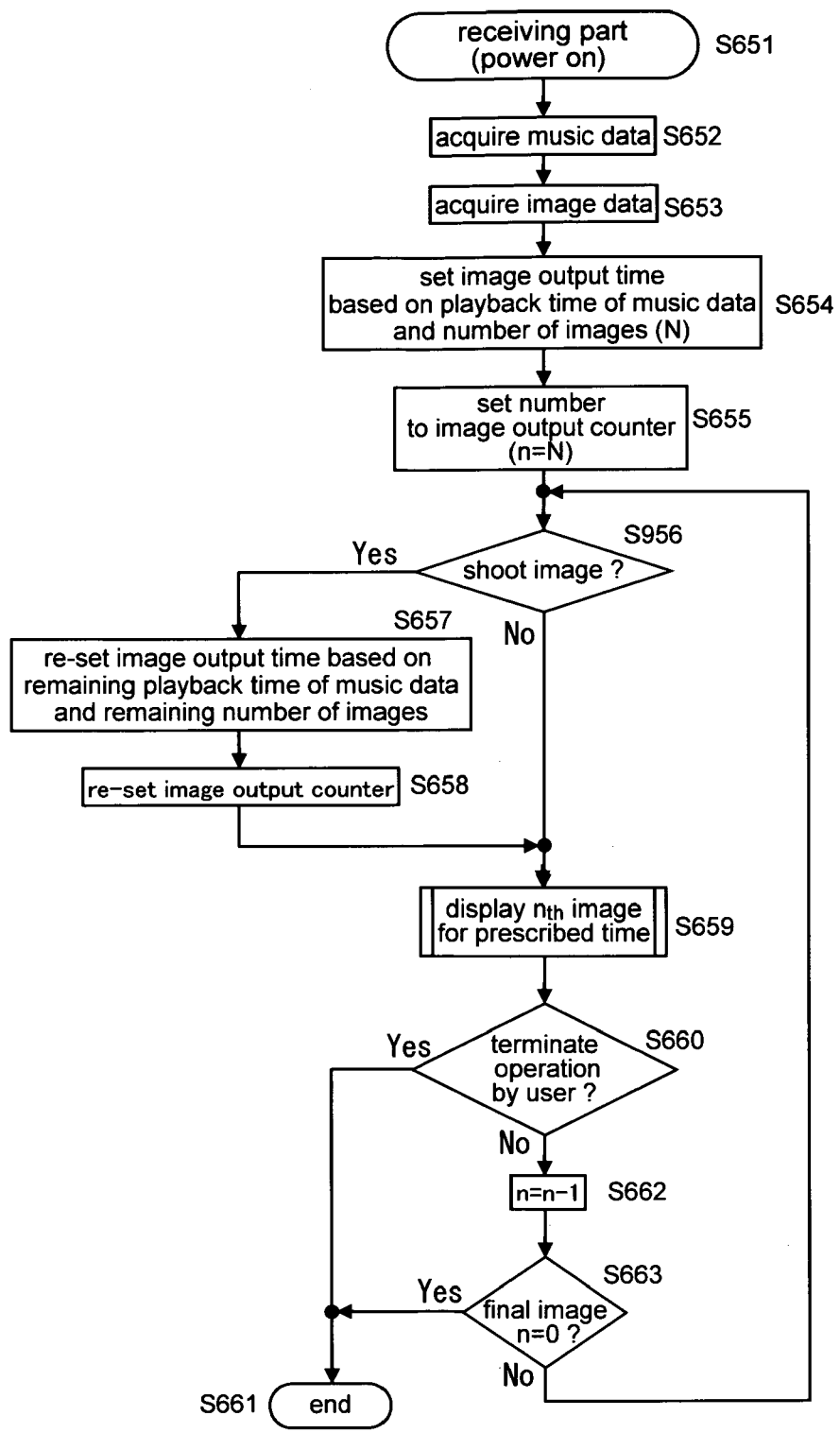
FIG. 25 is a flowchart for the camera including an image playback device according to Embodiment 13.

The operation of the CPU 104 of the camera 2510 will now be described with reference to a flowchart of FIG. 25.

The operation of the camera 2510 is substantially the same as that of the image playback device 1010 of Embodiment 7 and is different only in the processing performed in step S656 of FIG. 15. It is noted that when the camera 2510 is turned on in step S651, it is placed in a shootable state.

(Step S956) It is checked whether or not a user has pushed down the shutter button of the operation panel 115 for shooting a new image during the display of a slide show. When a new image has been shot, the process proceeds to step S657, and when not, the process proceeds to step S659. It is noted that a shot image is added for storage to the image data stored in the buffer memory 109.

Processing performed after next step S657 is performed in the same manner as in FIG. 15 of Embodiment 7, and the newly received image is inserted in the slide show to be displayed on the liquid crystal monitor 114.

In this manner, in the camera 2510 of this embodiment, even when a new image is shot in the middle of a slide show with music, the newly shot image is inserted to be displayed with display time for images re-set without suspending the slide show, and therefore, the slide show can be terminated in accordance with the playback time of the music.

Although the camera including the image playback device is described in this embodiment, the embodiment is applicable to a cellular phone with a camera.

The invention claimed is:

1. An image playback system comprising:
   an image playback device comprising:
      an input part that inputs images;
      an image output part that selects a plurality of images from the input images and sequentially outputs the plurality of images; and
      an output controlling part that allows the image output part to output the additional image when an image is additionally input to the input part during output of the images by the image output part; and
   an image shooting device that includes an image sensor shooting a subject image, an image processing part reducing an image shot by the image sensor, a communication part transmitting the reduced image to the image playback device, and a controlling part controlling the image processing part for reducing the image to attain an image transmitting and receiving time between the communication part and the image playback device shorter than an image output interval of the image output part.

2. The image playback system according to claim 1, wherein
   the output controlling part displays the additional image next to an image output by the image output part in image addition of the additional image.

3. The image playback system according to claim 1, wherein
   the output controlling part displays the additional image after outputting the plurality of images.

4. An image playback device comprising:
   an input part that inputs images;
   an image output part that selects a plurality of images from the input images and sequentially outputs the plurality images;
   an audio playback part that plays back audio;
   a playback time calculation part that calculates time for outputting images based on the number of the images output from the image output part and time for playing back the audio by the audio playback part; and
   an output controlling part that plays back the audio by the audio playback part while outputting the images from the image output part in accordance with the time calculated by the playback time calculation part, wherein
   the playback time calculation part calculates a second time for outputting the images still to be displayed and an additional image in accordance with remaining playback time of the audio when a new image is added during the outputting of the images.

5. The image playback device according to claim 4, wherein
the playback time calculation part calculates time for outputting the images based on the number of output repetitions, the number of images output in each repetition and the time for playing back the audio by the audio playback part, and when the new image is added, the playback time calculation part calculates the number of output repetitions of the images and the additional image in accordance with remaining playback time of the audio when the image output part outputs the images repeatedly a plurality of times.

6. The image playback device according to claim 4, wherein
the playback time calculation part reduces the number of outputs of the images in accordance with remaining playback time of the audio when the new image is added to the images.

7. The image playback device according to claim 4, wherein
the playback time calculation part deletes images in the same number as the additional image from the images when the new image is added to the images.

8. The image playback device according to claim 4, wherein
the playback time calculation part changes the time for playing back the audio by the audio playback part in accordance with the second time for outputting the additional images still to be displayed when the new image is added.

9. The image playback device according to claim 8, wherein
the output controlling part allows playback of the additional audio to be faded out during the playback in accordance with the time for outputting the images still to be displayed.

10. The image playback device according to claim 8, further comprising:
an input part that inputs at least one of the additional image and the additional audio.

11. The image playback device according to claim 4, wherein
the output controlling part adds audio to the audio output by the audio playback part when the new image is added to the images.

12. The image playback device according to claim 4, wherein
the image output part changes a displaying area of each of the images and the new image.

13. A camera comprising:
the image playback device of claim 4; and
an image shooting part, wherein
the new image corresponds to an image shot by the image shooting part.

14. An image playback system comprising:
the image playback device of claim 4; and
an image shooting device that includes an image sensor shooting a subject image, an image processing part reducing an image shot by the image sensor and an output part outputting the reduced image to the image playback device, and controls the image processing part for reducing the image to attain a pixel number sufficient for storing a plurality of images in an image storage part of the image playback device.

15. The image playback system according to claim 14, wherein
the image playback device outputs a free memory size of the image storage part to the image shooting device, and
the controlling part controls the image processing part in accordance with the free memory size of the image storage part.

16. The image playback system according to claim 14, wherein
the image shooting device includes a storage part storing the reduced image, and
the reduced image stored in the storage part is transmitted when an image having been output is output again.

17. The image playback system according to claim 14, wherein
the image shooting device includes one of a selection part selecting a reduction rate and a pixel number of an image, and
the image processing part reduces the image according to the reduction rate or the pixel number selected by the selection part.

18. An image playback system comprising:
the image playback device of claim 4; and
an image shooting device that includes an image sensor shooting a subject image, an image processing part reducing an image shot by the image sensor, a communication part transmitting the reduced image to the image playback device, and a controlling part controlling the image processing part for reducing the image to attain an image transmitting and receiving time between the communication part and the image playback device shorter than an image output interval of the image output part.

19. The image playback device according to claim 4, wherein
the output controlling part plays back the audio while outputting the images still to be displayed and the additional image in the second time which is calculated by the playback time calculation part.

20. A non-transitory computer-readable medium having computer-executable instructions executable by an image playback device for performing steps comprising:
outputting images with an image output part;
playing back audio with an audio playback part;
calculating, with a playback time calculation part, time for outputting images based on the number of the images output from the image output part and time for playing back the audio by the audio playback part; and
controlling play back of the audio by the audio playback part while outputting the images from the image output part in accordance with the time calculated by the playback time calculation part, wherein
the playback time calculation part calculates a second time for outputting the images still to be displayed and an additional image in accordance with remaining playback time of the audio when a new image is added during the outputting of the images.

21. The computer-readable medium according to claim 20, wherein
the playback time calculation part calculates time for outputting the images based on the number of output repetitions, the number of images output in each repetition and the time for playing back the audio by the audio playback part, and when the new image is added, the playback time calculation part calculates the number of output repetitions of the images and the additional image in accordance with remaining playback time of the audio when the image output part outputs the images repeatedly a plurality of times.

22. The computer-readable medium according to claim 20, wherein
  the playback time calculation part reduces the number of outputs of the images in accordance with remaining playback time of the audio when the new image is added to the images.

23. The computer-readable medium according to claim 20, wherein
  the playback time calculation part deletes images in the same number as the additional image from the images when the new image is added to the images.

24. The computer-readable medium according to claim 20, wherein
  the playback time calculation part changes the time for playing back the audio by the audio playback part in accordance with the second time for outputting the additional images still to be displayed when the a new image is added.

25. The computer-readable medium according to claim 24, wherein
  the controlling allows playback of the additional audio to be faded out during the playback in accordance with the second time for outputting the images still to be displayed.

26. The computer-readable medium according to claim 24, further comprising:
  instructions to input at least one of the additional image and the additional audio.

27. The computer-readable medium according to claim 20, wherein
  the controlling adds audio to the audio output by the audio playback part when the new image is added to the images.

* * * * *